US010965170B2

(12) United States Patent
Matsuo et al.

(10) Patent No.: US 10,965,170 B2
(45) Date of Patent: Mar. 30, 2021

(54) ELECTRONIC APPARATUS AND POWER FEEDING METHOD

(71) Applicant: KABUSHIKI KAISHA TOSHIBA, Tokyo (JP)

(72) Inventors: Ryoko Matsuo, Tokyo (JP); Kentaro Taniguchi, Kanagawa (JP); Toshiyuki Ogawa, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 226 days.

(21) Appl. No.: 16/128,302

(22) Filed: Sep. 11, 2018

(65) Prior Publication Data
US 2019/0280532 A1 Sep. 12, 2019

(30) Foreign Application Priority Data

Mar. 6, 2018 (JP) ................. 2018-039625

(51) Int. Cl.
*H02J 50/40* (2016.01)
*H02J 50/20* (2016.01)
*H02J 50/80* (2016.01)
*H02J 7/02* (2016.01)
*H04B 7/06* (2006.01)
*H04W 84/12* (2009.01)
*H04W 74/08* (2009.01)

(52) U.S. Cl.
CPC ............ *H02J 50/402* (2020.01); *H02J 7/025* (2013.01); *H02J 50/20* (2016.02); *H02J 50/40* (2016.02); *H02J 50/80* (2016.02); *H04B 7/0617* (2013.01); *H04W 74/0816* (2013.01); *H04W 84/12* (2013.01)

(58) Field of Classification Search
CPC ......... H02J 50/40–50/402; H02J 50/20–50/27; H02J 50/80
See application file for complete search history.

(56) References Cited

U.S. PATENT DOCUMENTS 9,953,763 B2    4/2018  Uchida et al.
2008/0014897 A1* 1/2008  Cook ................. H02J 50/40
                                                    455/343.1

(Continued)

FOREIGN PATENT DOCUMENTS

WO    WO 2013/146929 A1    10/2013

OTHER PUBLICATIONS

"IEEE 802.11", Feb. 21, 2018, Wikipedia, retrieved via Wayback machine at <https://web.archive.org/web/20180221070253/https://en.wikipedia.org/wiki/IEEE 802.11> (Year: 2018).*

*Primary Examiner* — Rexford N Barnie
*Assistant Examiner* — David A Shiao
(74) *Attorney, Agent, or Firm* — Foley & Lardner LLP

(57) ABSTRACT

According to one embodiment, an electronic apparatus includes a first transmitter configured to transmit a first wireless signal of power feeding, to a first terminal; a second transmitter configured to transmit a second wireless signal of power feeding, to the first terminal and controlling circuitry configured to control both the first transmitter and the second transmitter to transmit simultaneously at least a part of the first wireless signal from the first transmitter to the first terminal and the second wireless signal from the second transmitter to the first terminal.

15 Claims, 19 Drawing Sheets

(56) References Cited

U.S. PATENT DOCUMENTS

| | | | | |
|---|---|---|---|---|
| 2011/0156493 A1* | 6/2011 | Bennett | ............... | H02J 7/025 |
| | | | | 307/104 |
| 2012/0193999 A1* | 8/2012 | Zeine | ............... | H02J 7/0021 |
| | | | | 307/104 |
| 2012/0306284 A1* | 12/2012 | Lee | ............... | H04B 5/0037 |
| | | | | 307/104 |
| 2012/0326660 A1* | 12/2012 | Lu | ............... | H02J 50/005 |
| | | | | 320/108 |
| 2013/0058380 A1* | 3/2013 | Kim | ............... | H04W 76/14 |
| | | | | 375/146 |
| 2014/0292090 A1* | 10/2014 | Cordeiro | ............... | H02J 50/80 |
| | | | | 307/104 |
| 2016/0099602 A1* | 4/2016 | Leabman | ............... | H04B 5/0037 |
| | | | | 307/104 |
| 2016/0359376 A1* | 12/2016 | Zeine | ............... | H02J 50/40 |
| 2017/0256994 A1* | 9/2017 | Joyce | ............... | H04B 5/0037 |
| 2017/0302109 A1* | 10/2017 | Lee | ............... | H02J 7/025 |
| 2017/0331332 A1* | 11/2017 | Lee | ............... | H02J 50/23 |
| 2018/0026481 A1* | 1/2018 | Ku | ............... | H04B 5/0037 |
| | | | | 370/329 |
| 2018/0145542 A1* | 5/2018 | Choi | ............... | H04B 7/0617 |
| 2018/0287429 A1* | 10/2018 | Yamamoto | ............... | H02J 50/23 |
| 2018/0342905 A1* | 11/2018 | Fukaya | ............... | H02J 50/20 |
| 2019/0341811 A1* | 11/2019 | Elliott | ............... | H02J 13/00028 |

\* cited by examiner

ELECTRONIC APPARATUS AND POWER FEEDING METHOD

CROSS REFERENCE TO RELATED APPLICATIONS

This application is based upon and claims the benefit of priority from the prior Japanese Patent Application No. 2018-039625, filed on Mar. 6, 2018, the entire contents of which are incorporated herein by reference.

FIELD

Embodiments of the present invention relate to an electronic apparatus and a power feeding method.

BACKGROUND

Wireless power feeding is a technique of achieving power transmission without a cable, through electromagnetic induction, magnetic field resonance, radio waves or the like. Wireless power feeding does not require physical connection of devices. Accordingly, this technique has a high convenience. Furthermore, the risks of leakage and electric shock are reduced. Accordingly, safety can be ensured. According to these advantages, wireless power feeding is becoming widespread, specifically in the fields of mobile and vehicle-mounted devices.

Various schemes of wireless power feeding have been developed. There is, however, a problem of achievement of an efficient power feeding scheme, such as reduction in charging time, increase in transmissible power, and high transmission efficiency. A case of microwave power feeding through use of wireless LAN (Local Area Network) signals has a problem in that limitation on a permissible transmission power (e.g., 1 W) reduces the amount of received power. Accordingly, it is difficult to achieve efficient power feeding, such as power feeding in a short time, and high transmission efficiency.

SUMMARY

According to one embodiment, an electronic apparatus includes a first transmitter configured to transmit a first wireless signal of power feeding, to a first terminal; a second transmitter configured to transmit a second wireless signal of power feeding, to the first terminal and controlling circuitry configured to control both the first transmitter and the second transmitter to transmit simultaneously at least a part of the first wireless signal from the first transmitter to the first terminal and the second wireless signal from the second transmitter to the first terminal.

DETAILED DESCRIPTION

Figure 1:
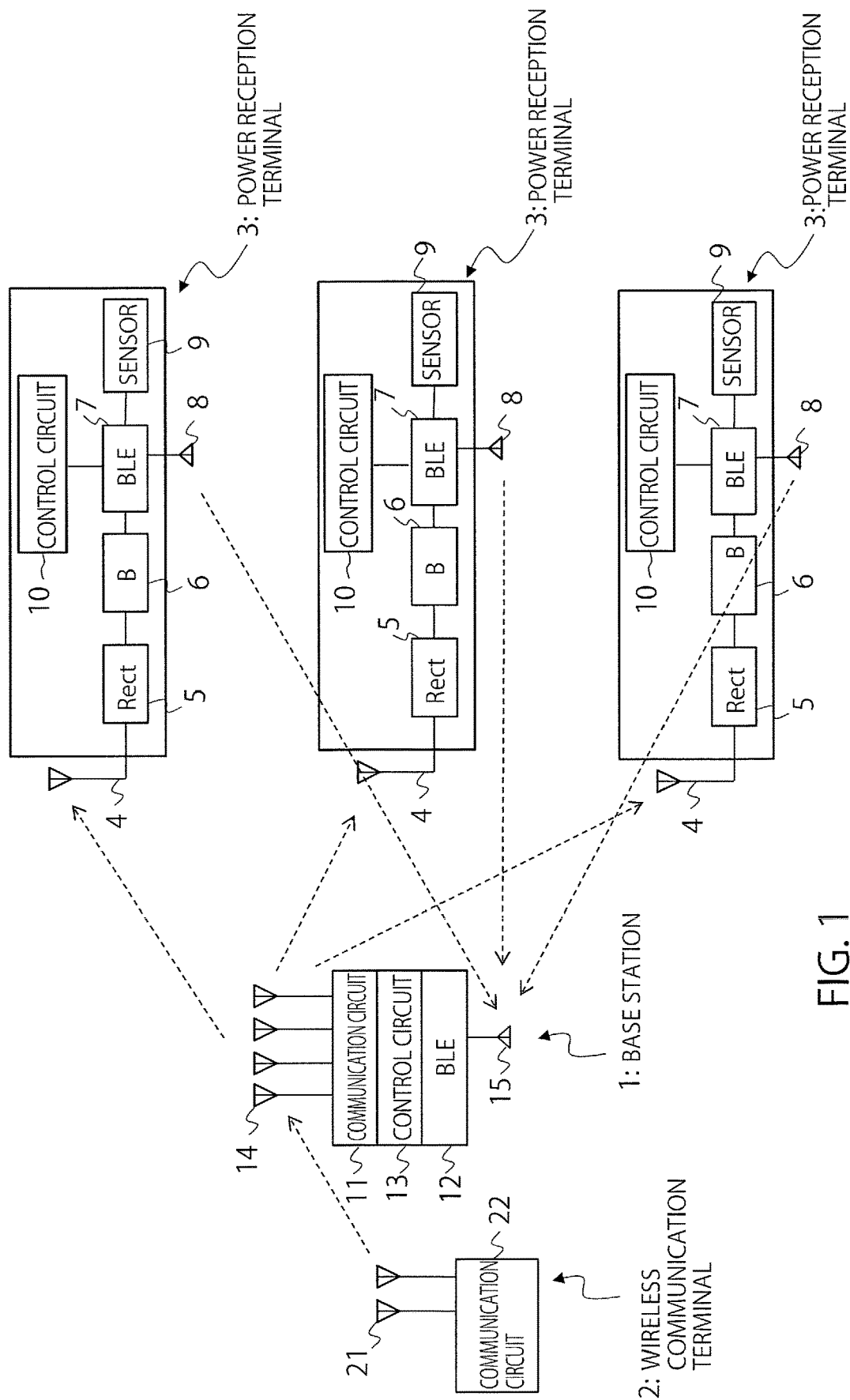
FIG. 1 is a diagram showing a configuration example of an overall system according to a first embodiment.

Hereinafter, referring to the drawings, embodiments of the present invention are described.

First Embodiment

FIG. 1 is a diagram showing a configuration example of an overall system according to this embodiment. Referring to FIG. 1, an overview of this embodiment is described. The system in FIG. 1 includes a base station (power feeding device) 1, a wireless communication terminal 2, and multiple power reception terminals 3. In the diagram, the number of wireless communication terminals 2 is three. However, the number may be any number at least one.

The base station 1 is a wireless communication device that conforms to, for example, an IEEE 802.11 series wireless LAN (Local Area Network) standard or its subsequent standard. The base station 1 is sometimes called an access point (AP). Here, the wireless LAN is an example of a wireless communication scheme. The wireless communication scheme used by the base station 1 may be a mobile communication scheme of an IEEE 802.16 series or its subsequent standard or another communication scheme.

The base station 1 can further perform communication through BLE (Bluetooth® Low Energy). The BLE is an example of the wireless communication scheme, and may perform communication other than BLE, for example, ZigBee®, Z-Wave®, Wireless USB, wireless LAN communication or the like. NFC (Near field radio communication) or the like is not excluded either.

The base station 1 includes: a communication circuit 11 capable of wireless communication, such as a wireless LAN; a BLE circuit 12 in conformity with BLE; and a control circuit 13. The control circuit 13 performs control of the communication circuit 11 and the BLE circuit 12. The base station 1 includes: an antenna 14 that the communication circuit 11 uses for transmission and reception; and an antenna 15 that the BLE circuit 12 uses for transmission and reception. The number of antennas 14 may be one or more. Any type and shape of the antenna may be adopted. The number of antennas 15 may be one or more. Any type and shape of the antenna may be adopted. The communication circuit 11 includes multiple transmitters that transmit wireless signals for power feeding. At least one (main transmitter) of the transmitters has a function of performing wireless transmission, such as of wireless LAN, and transmission (power feeding) of a wireless signal of power feeding. Another transmitter (sub-transmitter) transmits at least a part of the wireless signal of power feeding at the same time as the main transmitter, thereby assisting power feeding.

The wireless communication terminal 2 is a wireless communication device that conforms to, for example, an IEEE 802.11 series wireless LAN (Local Area Network) standard or its subsequent standard. The wireless communication terminal 2 may sometimes be called a station (STA). The communication scheme used by the wireless communication terminal 2 may be a mobile communication scheme of an IEEE 802.16 series or its subsequent standard, or another communication scheme. Note that the wireless communication terminal 2 is assumed to conform to a wireless communication scheme identical to or compatible with the wireless communication scheme that the base station 1 uses.

The wireless communication terminal 2 includes one or more antennas 21, and a communication circuit 22.

Each power reception terminal 3 is a wireless communication device capable of communication through BLE. Each power reception terminal 3 includes an antenna 4, a rectifier circuit 5, a rechargeable battery device 6, a BLE circuit 7, an antenna 8 for BLE, a sensor 9, and a control circuit 10. The antenna 4 and the rectifier circuit 5 integrally operate as a rectenna (rectifying antenna). The rechargeable battery device 6 can accumulate and release power (charges). The rechargeable battery device 6 may be a small secondary battery (rechargeable battery), such as a lithium-ion battery, or a capacitor. This embodiment assumes a rechargeable battery. The rechargeable battery device 6 is hereinafter denoted as a rechargeable battery 6. The BLE circuit 7 provides a communication function mainly through BLE.

In this embodiment, the description is made assuming that the communication circuit 11 of the base station 1 and the communication circuit 22 of the wireless communication terminal 2 communicate through a wireless LAN. Note that the wireless LAN is an example, which does not exclude use of another wireless communication scheme.

The description is made assuming that the base station 1, the wireless communication terminal 2, and each power reception terminal 3 are devices mounted on an automobile. Note that the automobile is an example. The devices may be on another mobile unit, such as a railroad vehicle, a ship, aircraft, a construction machine, or a robot, or on facilities, such as a power plant or a factory. The installation place is not specifically limited.

The wireless communication terminal 2 is a vehicle-mounted camera, for example. Each power reception terminal 3 is any of various types of monitor sensors, for example. Specific examples of the monitor sensor include a tire pneumatic sensor, an engine temperature sensor, and a room temperature sensor. However, the sensor is not limited thereto.

The base station 1 and the wireless communication terminal 2 operate by a battery mounted on an automobile or batteries mounted on the devices themselves. The battery may be a primary battery or a secondary battery.

The BLE circuit 7 in the power reception terminal 3 operates by the power accumulated in the rechargeable battery 6. The sensor 9 operates by the power accumulated in the rechargeable battery 6. The power reception terminal 3 receives, through the antenna 4, a wireless signal (power feeding signal) transmitted through the wireless LAN from the base station 1. The power reception terminal 3 converts the received wireless signal into DC energy by the rectifier circuit 5, and accumulates the DC energy in the rechargeable battery 6.

The control circuit 10 of the power reception terminal 3 controls the BLE circuit 7. The control circuit 10 transmits a power feeding request, through the BLE circuit 7 to the base station 1. The power feeding request includes, for example, pieces of information pertaining to requested power to be fed, which is the requested amount of power to be fed (requested amount of power) and power feeding timing. The control circuit 10 transmits, through the BLE circuit 7, received power amount information pertaining to the amount of received power received from the base station 1. For example, the received power amount information is a value that specifies the amount of received power, or the power conversion efficiency (sometimes called a power reception efficiency or transmission efficiency). The power conversion efficiency can be calculated from the ratio of the amount of received power to the amount of transmission power, for example. The received power amount information may be included in the power feeding request, which may then be transmitted.

As an example of the operation of the system in FIG. 1, the base station 1 receives video data periodically or at any timing from the wireless communication terminal 2. The base station 1 stores the received video data in an internal storage device, displays the data on a display device (for example, a screen of a path guide device), not shown, or executes image analysis.

The base station 1 wirelessly feeds power to the power reception terminal 3 by transmitting the wireless signal for wireless power feeding (power feeding signal) in response to the power feeding request issued by the power reception terminal 3. In this case, the base station 1 determines the number of transmitters to be used for power feeding among the transmitters included in the communication circuit 11, on the basis of the requested amount of power requested by the power reception terminal 3, and simultaneously transmits at least a part of the wireless signal using the determined number of transmitters. This embodiment assumes that the main transmitter is used as at least one of the transmitter to be used for power feeding. Alternatively, without such a requirement, the wireless signal may be transmitted only using the sub-transmitter; such transmission is not excluded either.

The base station 1 can transmit, to the power reception terminal 3, a beam that is radio waves having directivity according to weights set for the respective antennas 14. The base station 1 may perform wireless power feeding through the beam. The beam is generated by weighting the signal and combines the components weighted for the respective antennas 14. In a case where the antennas themselves have a variable directivity, the directivity of radio waves may be controlled by adjusting the antenna setting.

The base station 1 performs BLE communication, and periodically collects sensor data from the power reception terminal 3 and collects information representing the state of the power reception terminal 3 (e.g., the remaining amount of power of the rechargeable battery, and the received power amount information). The base station 1 may perform the control of the weights for antennas for the beam for transmission to the power reception terminal 3, the control of the modulation scheme, the control of the wireless frequency channel to be used (hereinafter, the channel), the control of the bandwidth to be used and the like, using the received power amount information. The base station may calculate the power conversion efficiency using the received power amount information. The power conversion efficiency can be calculated from the ratio of the received power value (or the amount of received power) to the transmission power value (or the amount of transmission power), for example. The amount of power is the electric energy, or the quantity of electric charges. The wireless signal (power feeding signal) transmitted by the base station 1 may be continuous waves (i.e., is not necessarily a signal conforming to the format defined according to a standard, such as BLE or wireless LAN), or may be a signal conforming to the frame format of a standard, such as of wireless LAN.

In the following description, the frequency band used by the wireless LAN is different from the frequency band used by BLE. For example, the wireless LAN uses 5 GHz band, and the BLE, which is a type of Bluetooth, uses 2.4 GHz band. Note that the wireless LAN may use the 2.4 GHz identical to that of BLE, and the frequency bands of the wireless LAN and BLE may overlap each other.

The base station 1 and the wireless communication terminal 2 operate with the energy from the battery of an automobile. Consequently, the energy is supplied upon start of the engine, and the operation becomes possible immediately. Meanwhile, the power reception terminal 3 operates on the basis of the power accumulated in the rechargeable battery 6. Consequently, the battery is required to be charged appropriately. The base station 1 according to this embodiment has one characteristic of efficiently supplying power to the power reception terminal 3.

Hereinafter, the base station 1, the wireless communication terminal 2 and the power reception terminals 3 in FIG. 1 are described in further detail.

Figure 2:
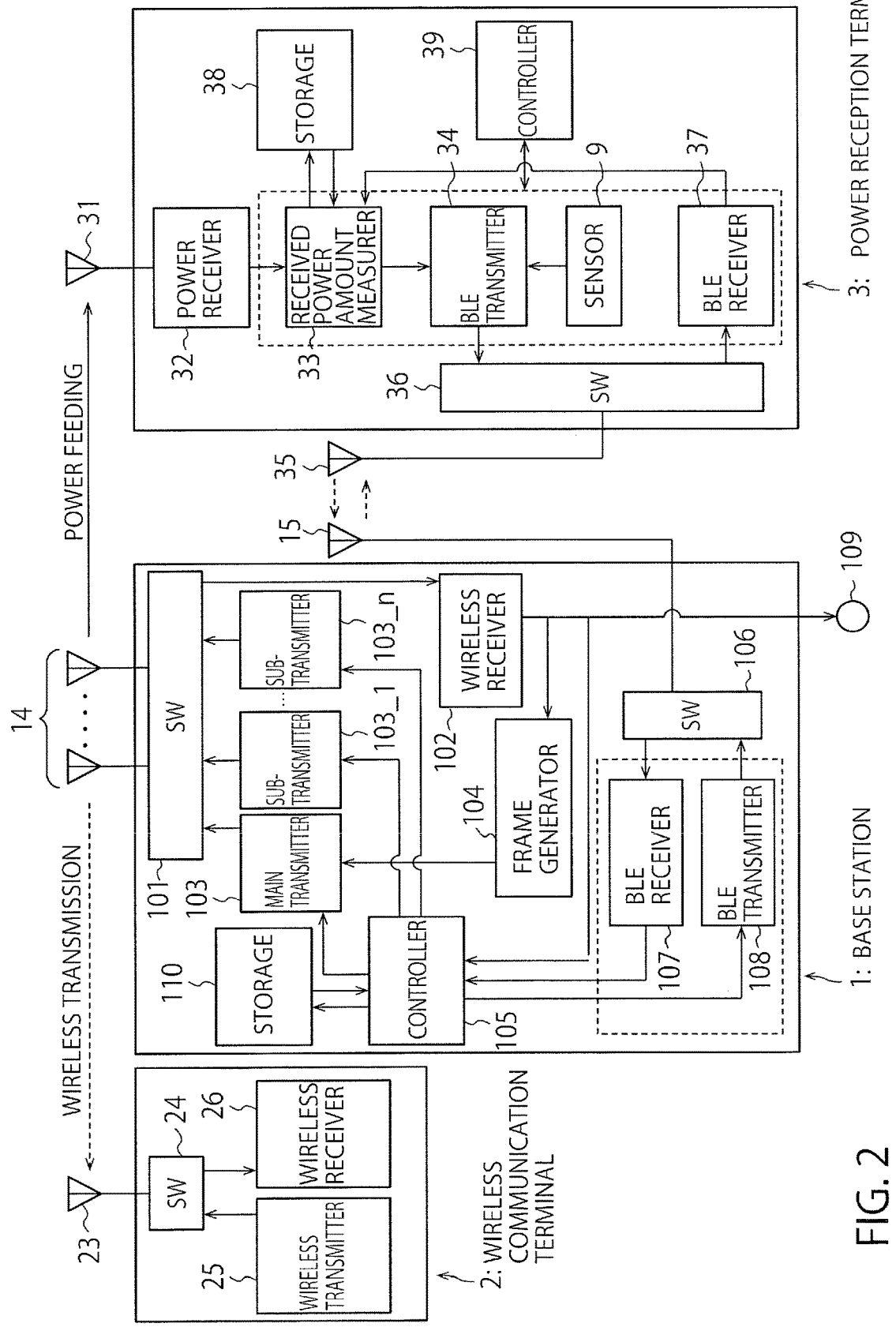
FIG. 2 is a block diagram of a wireless communication system according to the first embodiment.

FIG. 2 is a block diagram of a wireless communication system according to the first embodiment. In this embodiment, elements having common names in each diagram are assigned the same symbols. Redundant description is appropriately omitted.

The wireless communication system according to this embodiment includes the base station 1, the wireless communication terminal 2, and the power reception terminals 3. FIG. 2 shows a single power reception terminals 3. In actuality, multiple terminals may reside (see FIG. 1).

The wireless communication device (electronic apparatus) mounted on the base station 1 includes: one or more antennas 14 for wireless communication, one or more antennas 15 for BLE, a switch 101, a wireless receiver 102, a wireless transmitter (main transmitter) 103, one or more wireless transmitters (sub-transmitters) 103_1 to 103_$n$ ($n$ is an integer of at least one), a frame generator 104, a controller 105, a switch 106, a BLE communicator (BLE communication circuit) 111 (BLE receiver 107 and a BLE transmitter 108), an IF 109, and a storage 110. A combination of the wireless transmitter 103, the frame generator 104 and the wireless receiver 102 corresponds to the wireless communicator (wireless communication circuit), for example. The controller 105 corresponds to controlling circuitry, for example. Any one wireless transmitter (sub-transmitter) is denoted as "103_$x$" ($x$ is an integer ranging from 1 to n, inclusive).

The switch 101 is a switch for switching the antennas 14 between the main transmitter 103 and the sub-transmitters 103_1 to 103_$n$, and the wireless receiver 102. The switch may be connected to all the main transmitter 103 and the sub-transmitters 103_1 to 103_$n$ at the same time. Alternatively, the switch may be connected only to transmitters actually used for transmission among the transmitters.

The frame generator 104 generates a frame for transmission to the wireless communication terminal 2. In a case where the base station 1 communicates through the wireless LAN, the frame is a MAC frame. The wireless LAN standard frames include a data frame, a management frame and a control frame, and may be any of these frames.

The base station 1 periodically transmits a beacon frame for notifying the attribute of the base station itself or synchronization information. The beacon frame is a management frame. Examples of the control frame include an RTS (Request to Send) frame for issuing a transmission request to the opposite terminal, a CTS (Clear to Send) frame for providing a transmission permission, and an ACK frame or a BA (Block Ack) frame that serves as an acknowledgement frame. The frames listed here are only examples. There are other various frames.

The wireless transmitter 103 transmits the frame generated by the frame generator 104, through the antennas 14. In actuality, a header on a physical layer is added to the frame to form a packet, and the packet is transmitted. The main transmitter 103 error-correcting encodes and modulates the frame (more specifically, the packet), and generates a modulated signal. The modulated signal is converted into an analog signal. The main transmitter 103 uses an oscillator and a PLL (Phase Locked Loop) circuit to generate a signal having a certain frequency, and causes a transmission mixer to up-convert the analog signal into that having a wireless frequency on the basis of the generated signal having the certain frequency. The main transmitter 103 causes an RF amplifier to amplify the up-converted signal, and transmits the amplified signal as radio waves through the antennas 14 into the air. Accordingly, the frame (packet) through the wireless frequency is transmitted.

Under control of the controller 105, the main transmitter 103 and the sub-transmitters 103_1 to 103$n$ generate a wireless signal for wireless power feeding (power feeding signal), and transmit the wireless signal through the antennas 14. More specifically, the main transmitter 103 and the sub-transmitters 103_1 to 103$n$ generate a wireless signal according to a power feeding parameter designated by the controller 105. The wireless signal can be generated using an output signal of the oscillator to be used during transmission of the frame or the packet, or an output signal of the PLL circuit. For example, power feeding data according to the power feeding parameter, and the output signal may be mixed by the transmission mixer to generate the wireless signal. Alternatively, a signal source for the wireless signal may be prepared, and the wireless signal can be generated based on the power feeding parameter using the signal source. The frequency channels used by the main transmitter 103 and the sub-transmitters 103_1 to 103$n$ are different from each other. Alternatively, two or more wireless transmitters among the main transmitter 103 and the sub-transmitters 103_1 to 103$n$ may use the same frequency channel.

The wireless signal of power feeding can be generated using the frame generated by the frame generator 104. For example, the beacon frame can be used as a wireless signal. Alternatively, the frame for wireless power feeding may be defined, and the frame may be transmitted as the wireless signal. In this case, the frame generator 104 is connected to the sub-transmitters 103_1 to 103n, and the frame generated by the frame generator 104 is provided for the sub-transmitters 103_1 to 103n.

The controller 105 controls communication with the wireless communication terminal 2 using the frame generator 104.

The controller 105 determines the number of wireless transmitters to be used for power feeding, and selects the determined number of wireless transmitters from among the main transmitter 103 and the sub-transmitters 103_1 to 103n. According to an example of the selecting method, in a case where the determined number is one, the main transmitter 103 may be selected. In a case where the determined number is two or more, the main transmitter 103 may be selected with priority, and the remaining wireless transmitters may be selected from among the sub-transmitters 103_1 to 103n. Alternatively, the determined number of wireless transmitters can be arbitrarily selected from among the main transmitter 103 and the sub-transmitters 103_1 to 103n. The transmission powers of the main transmitter 103 and the sub-transmitters 103_1 to 103n may be the same. Alternatively, the powers may be different or be adjustable according to the wireless transmitters. The controller 105 controls generation of the wireless signal individually according to the selected wireless transmitters, and performs control so as to transmit at least a part of the wireless signal from the selected wireless transmitters at the same time.

The controller 105 controls the setting of the power feeding parameter for the wireless signal to be transmitted by the main transmitter 103 and the sub-transmitters 103_1 to 103n. An example of setting items is weights for the respective antennas. Another example is a modulation scheme or a modulation and coding scheme (MCS). Yet another example is a channel to be used. For example, the channel is a channel to be used among multiple channels residing in the wireless LAN band.

The weight means an adjustment value for the amplitude or the phase of the transmission signal. Various beams can be formed by adjusting the amplitude and the phase of the signal to be transmitted with respect to the individual antennas. Formation of a beam suitable for the power reception terminals 3 can achieve wireless signal transmission with a high power conversion efficiency (transmission efficiency).

The setting of weights for the respective antennas that can form a beam preferable for the power reception terminals 3 (a beam having a high transmission efficiency) is not preliminarily determined in many cases. Accordingly, the wireless signal is transmitted with various weights, and pieces of received power amount information are fed back, thereby allowing the weights suitable for the respective power reception terminals 3 to be determined.

The setting items of the power feeding parameter described above are only examples. Other various items can be controlled.

The wireless receiver 102 demodulates the signal received from the wireless communication terminal 2 to obtain the frame. More specifically, the signal received by the antennas 14 is input into the wireless receiver 102.

The wireless receiver 102 causes an LNA (Low Noise Amplifier) amplifier to amplify the received signal. The wireless receiver 102 extracts a signal in a desired band from the amplified signal using a reception filter. The wireless receiver 102 down-converts the extracted signal on the basis of a signal that is in a certain frequency and is generated by the oscillator and the PLL circuit. The wireless receiver 102 applies demodulation and decoding to obtain the frame.

If the obtained frame is a data frame, the wireless receiver 102 outputs the data included in the data frame through the IF 109. The IF 109 is an interface for outputting the frame received by the wireless receiver 102, to an upper layer or a buffer between this interface and the upper layer. The wireless receiver 102 outputs a frame analysis result to the frame generator 104 or the controller 105 so as to perform the operation according to the type of the received frame. For example, in the case of issuing an acknowledgement response, information required for the acknowledgement response is output to any or both of the frame generator 104 and the controller 105, thus allowing the acknowledgement response frame to be received after a certain time period has passed from completion of receipt.

The switch 106 is a switch for switching the antenna 15 between the BLE receiver 107 and the BLE transmitter 108.

The BLE receiver 107 receives a BLE signal. The BLE receiver 107 receives data from the power reception terminal 3 through the antenna 15 for BLE. Examples of the received data include a power feeding request, sensor data, and information (received power amount information) pertaining to the amount of received power received by the power reception terminal 3.

The BLE receiver 107 is connected to the controller 105, and supplies the controller 105 with the power feeding request and the received power amount information received from the power reception terminal 3. The BLE receiver 107 transmits the sensor data received from the power reception terminal 3, to a monitoring device (not shown) in the vehicle. The monitoring device verifies the presence or absence of an abnormality at a sensing site on the basis of the sensor data. The controller 105 may also play the role of the monitoring device. In this case, the BLE receiver 107 supplies the sensor data to the controller 105.

The BLE transmitter 108 is connected to the controller 105, and transmits the data designated by the controller 105 to the power reception terminals 3 through the antenna 15. Examples of the data to be transmitted include the power feeding parameter (the weights for the respective antennas used to transmit the wireless signal from the base station 1, their transmission powers, etc.), and measurement instruction information on the amount of received power.

The storage 110 is connected to the controller 105, and stores control data. The storage 110 may be a volatile memory, such as SRAM or DRAM, or a nonvolatile memory, such as NAND, MRAM or FRAM. This storage may be a storage device, such as a hard disk or an SSD.

The main transmitter 103, the sub-transmitters 103_1 to 103n, the wireless receiver 102 and the frame generator 104 in the base station 1 corresponds to the communication circuit 11 in the base station 1 shown in FIG. 1, for example. The controller 105 in the base station 1 corresponds to the control circuit 13 in the base station 1 shown in FIG. 1, for example. The BLE receiver 107 and the BLE transmitter 108 in the base station 1 correspond to the BLE circuit 12 in the base station 1 shown in FIG. 1, for example.

The wireless communication device mounted on the wireless communication terminal 2 includes an antenna 23, a switch 24, a wireless transmitter 25, and a wireless receiver 26. The switch 24 is a switch for switching the connection destination of the antenna 23 between the wireless transmitter 25 and the wireless receiver 26. The wireless transmitter 25 transmits a MAC frame generated by the wireless communication terminal 2, through the antennas 23. The wireless receiver 26 receives the MAC frame from the base station 1 and another wireless communication terminal.

The antenna 23 is an antenna that can transmit and receive a wireless LAN signal. The wireless transmitter 25 and the wireless receiver 26 have functions analogous to those of the main transmitter 103 and the wireless receiver 102 in the base station 1. The wireless transmitter 25 and the wireless receiver 26 correspond to the communication circuit 22 included in the wireless communication terminal 2 in FIG. 1, for example.

The wireless communication device mounted on the power reception terminal 3 includes a sensor 9, an antenna 31 for wireless LAN, a power receiver 32, a received power amount measurer 33, a BLE transmitter 34, a BLE antenna 35, a switch 36, a BLE receiver 37, a storage 38, and a controller 39.

The power receiver 32 receives, through the antenna 31, the wireless signal (power feeding signal) transmitted from the base station 1, and converts (rectifies) the received wireless signal into direct current. The power receiver 32 charges the rechargeable battery 6 with the converted direct current.

The received power amount measurer 33 measures the amount of power (amount of received power) of the received wireless signal. The method of measuring the amount of received power may be any method. For example, the amount of received power may be obtained according to the change in voltage before and after measurement. Specifically, the amount of received power is measured from the difference between voltages before and after measurement and from the battery capacity. Information pertaining to the measured amount of received power is stored in the storage 38.

The BLE transmitter 34 performs communication through BLE. The BLE transmitter 34 transmits the information pertaining to the measured amount of received power (received power amount information) through the BLE antenna 35. The received power amount information includes a value for specifying the measured amount of received power, for example. The value for specifying the amount of received power may be the value of the amount of received power, or the value of change in the voltage of the rechargeable battery 6 before and after measurement. In a case where the characteristics of the rechargeable battery 6 can be grasped by the base station 1, the amount of received power can be calculated by the base station 1 from the value of change in voltage.

The received power amount measurer 33 or the controller 39 may calculate the power conversion efficiency as the received power amount information. The power conversion efficiency can be calculated from the ratio between the received power value (or the amount of received power) and the transmission power value (or the amount of transmission power). It is assumed that the transmission power value (or the amount of transmission power) is preliminarily notified from the base station 1, or the amount of transmission power (or the amount of transmission power) is preliminarily designated by the power feeding request. Alternatively, the transmission power value (or the amount of transmission power) may be predefined according to the system or specifications. The average received power or the maximum received power value may be used as the received power value. The average transmission power value or the maximum transmission power value may be used as the transmission power value.

The switch 36 is a switch for switching the connection destination of the antenna 35 between the BLE transmitter 34 and the BLE receiver 37.

The BLE receiver 37 receives a BLE signal. The BLE receiver 37 receives data from the base station 1 through the antenna 35 for BLE. For example, data to be received is any one of the power feeding parameter and the measurement instruction information.

The storage 38 stores the information pertaining to the measured amount of received power measured by the received power amount measurer 33 (received power amount information), or any data. The storage 38 may be a volatile memory, such as SRAM or DRAM, or a nonvolatile memory, such as NAND, MRAM or FRAM, or a storage device, such as a hard disk or an SSD, or a combination thereof.

The controller 39 controls the received power amount measurer 33, the BLE transmitter 34, the BLE receiver 37, and the sensor 9. The controller 39 transmits a power feeding request, through the BLE transmitter 34 to the base station 1. For example, the power feeding request may include any of setting values that are the amount of power (the required amount of power, or the power feeding amount) required to be supplied from the base station 1, the power feed duration, the number of wireless signal transmissions, the length of the wireless signal per transmission, the transmission power value, etc., or any combination thereof. In a case where some of these setting values are predefined according to the system or specifications, the predefined setting values are not necessarily included in the power feeding request. The setting values may be transmitted separately from the power feeding request. The transmission timing of the power feeding request may be any timing. For example, the timing may be timing when the remaining amount of power of the rechargeable battery 6 becomes a threshold or less, or a timing when a predetermined time point is reached. Note that the transmission timing is not limited thereto. For example, the timing may be a timing when a predetermined time elapsed from a time point serving as a reference.

The antenna 31 and the power receiver 32 in the power reception terminal 3 correspond to the antenna 4, the rectifier circuit 5 and the rechargeable battery 6 in the power reception terminal 3 in FIG. 1, for example. The received power amount measurer 33, the BLE transmitter 34 and the BLE receiver 37 in the power reception terminal 3 correspond to the BLE circuit 7 in the power reception terminal 3 in FIG. 1, for example. The controller 39 corresponds to the control circuit 10 in the power reception terminal 3 in FIG. 1, for example.

Figure 3:
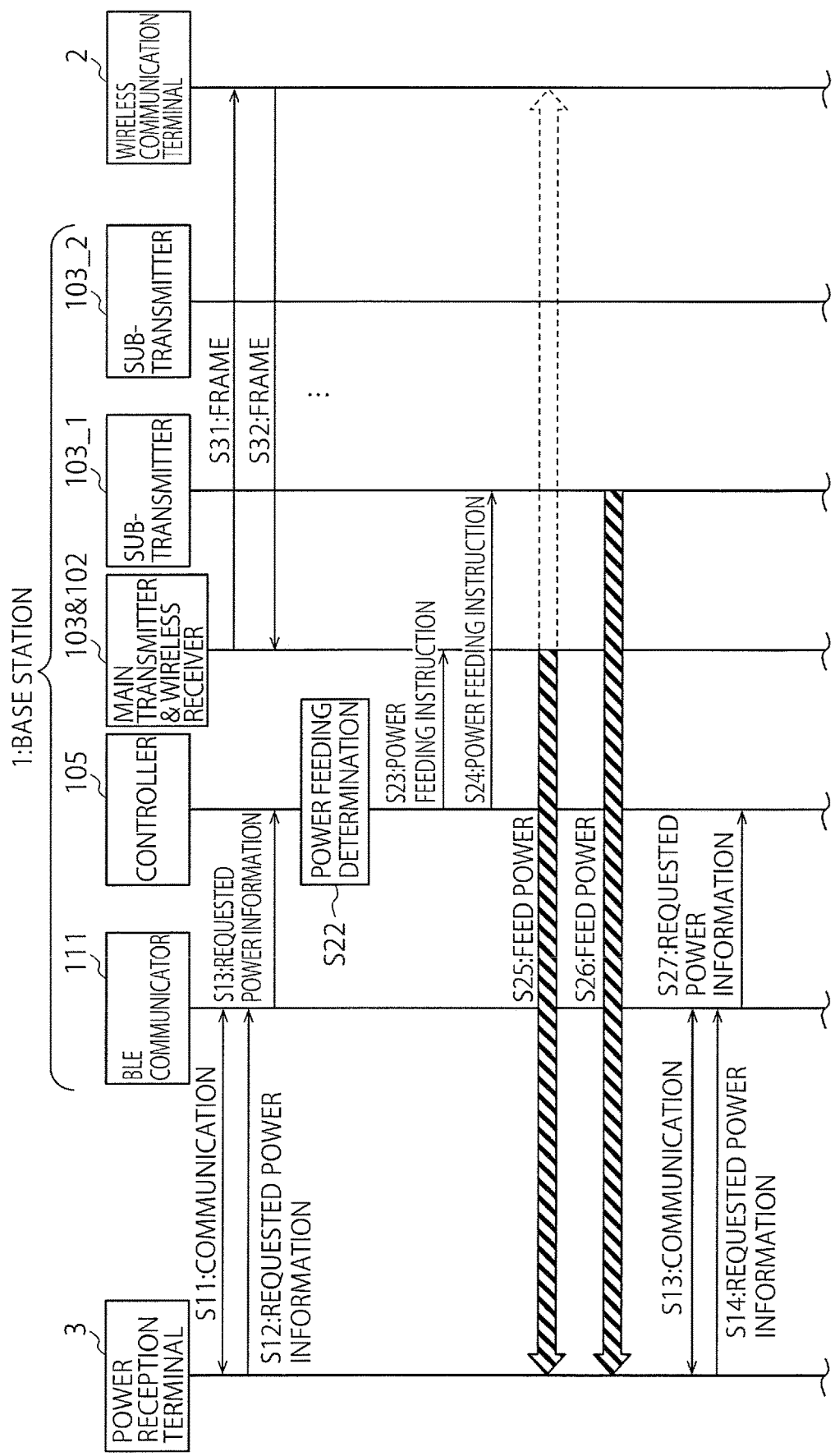
FIG. 3 is a sequence diagram of the wireless communication system in FIG. 2.

FIG. 3 shows an example of an operation sequence of the base station 1, the power reception terminal 3 and the wireless communication terminal 2.

Figure 4:
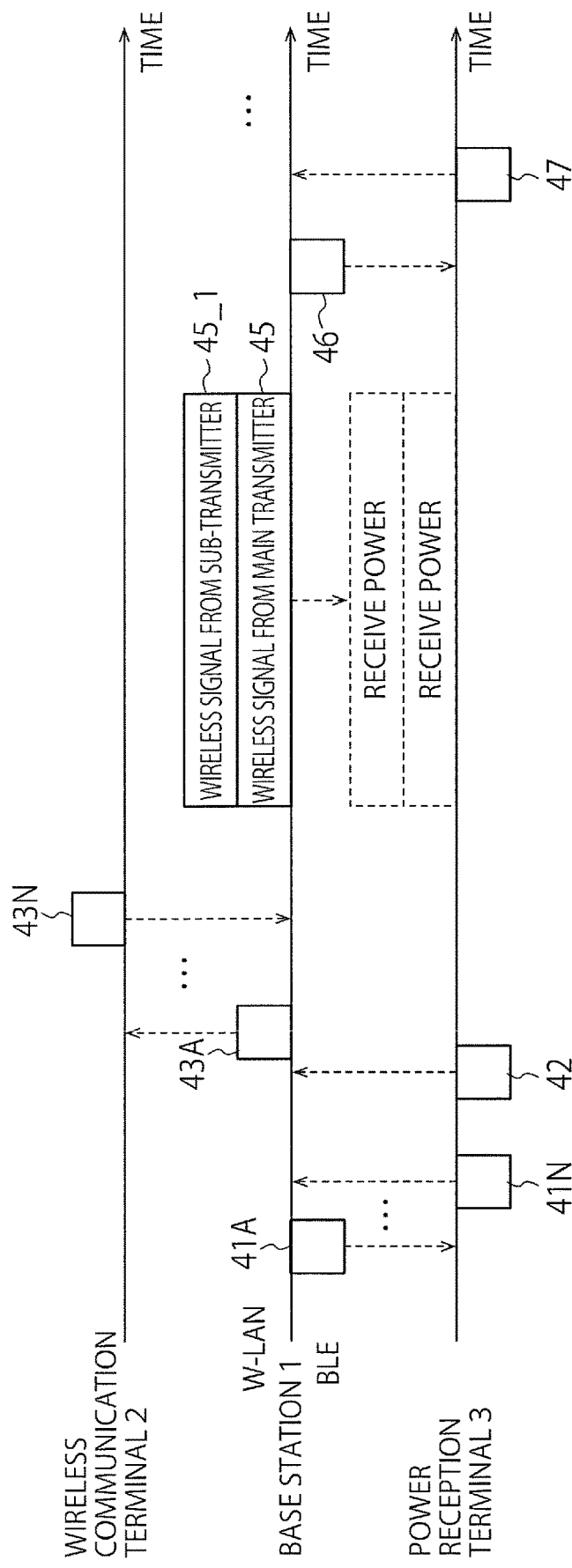
FIG. 4 is a diagram showing a sequence example of signal transmission and reception corresponding to FIG. 3.

FIG. 4 shows a sequence example of transmission and reception between the base station, the power reception terminal and the wireless communication terminal, and corresponds to the operation sequence of FIG. 3.

The BLE communicator 111 (the BLE transmitter 108 and the BLE receiver 107) of the base station 1 communicates with the power reception terminal 3 (S11). For example, the BLE communicator 111 transmits, to the power reception terminal 3, any one of the power feeding parameter and the measurement instruction information. The BLE communicator 111 periodically receives, from the power reception terminal 3, sensor data measured by the sensor of the power reception terminal 3. The BLE communicator 111 transmits a request for data representing the state of the power reception terminal 3, such as the remaining amount of power of the rechargeable battery, and receives the requested data from the power reception terminal 3. FIG. 4 shows the situations where freely selected data items 41A, . . . , 41N are transmitted and received between the base station 1 and the power reception terminal 3.

The power reception terminal 3 determines whether power feeding is required or not at any timing or a predetermined timing. If required, the terminal determines the requested amount of power to be fed (requested amount of power). The power feeding request 42 including the information representing the requested amount of power (requested power information) is transmitted through BLE (S12). For example, when the remaining amount of power of the rechargeable battery 6 becomes lower than a threshold, the power reception terminal 3 determines that power feeding is required. The requested amount of power may be a difference between a target value and the remaining amount of power of the rechargeable battery 6, or an amount of power having a predetermined value, or may be determined by another method. The target value of the remaining amount of power may be, for example, a predetermined ratio to the capacity of the rechargeable battery, such as 80% of the capacity of the rechargeable battery, or a value set by a user of the power reception terminal 3.

In this example, the power reception terminal 3 autonomously transmits the power feeding request. Alternatively, the BLE communicator 111 of the base station 1 may transmit a query of whether power feeding is required or not to the power reception terminal 3 through BLE in step S11. In response thereto, if the power reception terminal 3 requires power feeding, the terminal may transmit the requested power information in step S12.

The BLE communicator 111 of the base station 1 receives the power feeding request transmitted from the power reception terminal 3, through BLE (S12).

Meanwhile, the base station 1 performs wireless LAN communication with the wireless communication terminal 2 and transmits and receives (exchanges) frames (S31, S32, . . . ). FIG. 4 shows the situations where freely selected frames 43A, . . . , 43N are transmitted and received between the base station 1 and the wireless communication terminal 2. In a case where the frequency channels to be used are different between BLE and wireless LAN, steps S11 and S12 and steps S31 and S32 may be performed at the same time, or may be performed at different times.

The controller 105 of the base station 1 identifies the requested amount of power of the power reception terminal 3 on the basis of the requested power information included in the power feeding request received by the BLE communicator 111. The controller 105 determines the number of wireless transmitters (the main transmitter and the sub-transmitters) to be used for power feeding, or the combination of wireless transmitters to be used, on the basis of the requested amount of power (S22). In the example in the diagram, it is determined that two wireless transmitters are used, and it is assumed that one of the transmitters is the main transmitter 103 and the other is the sub-transmitter 103_1.

The controller 105 determines the amount of transmission power to be transmitted from each of the determined wireless transmitters (the main transmitter 103 and the sub-transmitter 103_1) (the same S22). A value obtained by multiplying, by the power conversion efficiency, the total of the amounts of transmission power transmitted from the respective wireless transmitters is configured to be the requested amount of power or higher. The controller 105 calculates the wireless signal length required for power transmission with the determined amount of transmission power, for each of the main transmitter 103 and the sub-transmitter 103_1 (the same S22). It is herein assumed that the main transmitter 103 and the selected sub-transmitter 103_1 have the same amount of transmission power, and have the same wireless signal length and the same transmission power value. It is assumed that the transmission power value of each transmitter is determined to be the same value. Alternatively, in a case where the transmission power of each transmitter can be adjustable, the transmission power of each transmitter can be determined.

The controller 105 determines the frequency channels (hereinafter, channels) used for power feeding by the main transmitter 103 and the sub-transmitter 103_1. For example, the channel of the main transmitter 103 is the same as the channel used by the main transmitter 103 for communication with the wireless communication terminal 2. The channel of the sub-transmitter 103_1 is determined as a channel different from that of the main transmitter 103.

For example, in a case where the number of wireless LAN channels is four (channels 1 to 4), and the main transmitter 103 uses the channel 1, a channel (e.g., the channel 2) is selected for the sub-transmitter 103_1 from among the channels 2 to 4, which are other than the channel 1. Orders of priority may be preliminarily set for the channels. The channels may be selected in descending order of priority. Alternatively, the situations of each channel may be measured, and a channel with a low congestion degree (for example, a channel with a carrier sense busy rate that is equal to or less than a threshold) may be selected. Alternatively, channels to be used may be predetermined for the respective sub-transmitters. In a case where multiple sub-transmitters are used, orders of priority as selection orders are set for the sub-transmitters, and the channels with higher priorities may be sequentially allocated according to the descending order of the priority. The channels may be allocated by a method other than that described here.

The controller 105 sets the selected channel (e.g., the channel 2) for the sub-transmitter 103_1. In a case where the channel used by the main transmitter 103 for power feeding is different from the channel used for communication with the wireless communication terminal 2, a channel is required to be set also for the main transmitter 103. In this case, the channel of the main transmitter 103 is required to be returned to the original channel after power feeding. The controller 105 may notify the main transmitter 103 and the sub-transmitter 103_1 with the power feeding parameter (the weights of the antennas, etc.). As described above, the controller 105 constructs the environment for power feeding.

The controller 105 outputs, to the main transmitter 103 and the sub-transmitter 103_1, a power feeding instruction signal for instruction of generating and transmitting wireless signals having the determined wireless signal lengths (S23 and S24). In a case where the transmission power is adjustable, a designation of the transmission power value may be included in the power feeding instruction signal. It is herein assumed that the transmission powers of the main transmitter 103 and one sub-transmitter 103_1 are predetermined values.

Before the power feeding instruction signal is output, the controller 105 obtains access rights to a wireless medium with respect to the channels to be used by the main transmitter 103 and the sub-transmitter 103_1 according to CSMA/CA (Carrier Sense Multiple Access with Collision Avoidance). Specifically, carrier sense is performed during a standby time that is a total of a fixed time and a randomly determined backoff time. When the state of the wireless medium is determined to be idle, the access right is obtained and the power feeding instruction signal is output. The power feeding instruction signals may be simultaneously output to the main transmitter 103 and the sub-transmitter 103_1. Alternatively, the signals may be output in an order of access right obtainment. Here, the case of simultaneous output is assumed. In the case of simultaneous output, it may be provided that in a predetermined time period after obtainment of the access right to one channel, the access right to the other channel can be also obtained.

The main transmitter 103 and the sub-transmitter 103_1 generate wireless signals according to the respective power feeding instruction signals, transmit the generated wireless signals, in the set channels, with predetermined transmission powers, to the power reception terminal 3 (S25 and S26). The main transmitter 103 and the sub-transmitter 103_1 may weight the signals with weights set to the antennas 14, and transmit the wireless signals as a beam having directivity to the power reception terminal 3.

As described above, power is fed to the power reception terminal 3 using the two wireless transmitters. The controller 105 simultaneously outputs the power feeding instruction signals to the main transmitter 103 and the sub-transmitter 103_1, thereby allowing at least a part of the wireless signals to be transmitted from the main transmitter 103 and the sub-transmitter 103_1. The transmissions of the wireless signals from the main transmitter 103 and the sub-transmitter 103_1 are not necessarily simultaneously started and finished. It is only required that both the wireless signals are simultaneously transmitted in at least a partial duration. FIG. 4 shows the situations where the wireless signals 45 and 45_1 are simultaneously transmitted from the main transmitter 103 and the sub-transmitter 103_1, respectively.

Other diverse variations may be adopted as the mode of transmitting the wireless signals from the main transmitter 103 and the sub-transmitter 103_1. For example, the transmission duration of the wireless signal transmitted from the main transmitter 103 is substantially identical to the transmission duration of the wireless signal transmitted from the sub-transmitter 103_1. That is, the transmission periods only accompanied by an extent of a transmission timing error due to implementation can be regarded to be identical to each other. According to another example, a slight offset may be intentionally added between the transmission duration of the wireless signal to be transmitted from the main transmitter 103 and the transmission duration of the wireless signal to be transmitted from the sub-transmitter 103_1. For example, an offset of about 1% to 20% (or 30%) may be added between the time length of the wireless signal to be transmitted from the main transmitter 103 and the time length of the wireless signal to be transmitted from the sub-transmitter 103_1.

The power reception terminal 3 receives the wireless signals transmitted from the main transmitter 103 and the sub-transmitter 103_1, converts the energy based on the received wireless signals into direct current, and accumulates the current in the rechargeable battery 6. The antenna 31 of the power reception terminal 3 is a wide band antenna, and can receive signals in any channel used by the base station 1 for power feeding.

The channel used by the main transmitter 103 is identical to the channel used for communication with the wireless communication terminal 2. Consequently, the wireless signal transmitted from the main transmitter 103 serves as an interference signal for the wireless communication terminal 2. A broken thick arrow in step S25 in FIG. 3 means the interference signal.

Subsequently, a sequence analogous to steps S11 to S26 described above is repeated (S13, S14, S27, . . . ). In this sequence, the requested power information is transmitted in steps S12 and S14. The power reception terminal 3 is not necessarily required to transmit the requested power information every time of request for power feeding. In this case, the power feeding amount to the power reception terminal 3 may be determined by the base station 1. In this case, for example, the base station 1 may obtain information on the remaining amount of power of the power reception terminal 3, and determine the power feeding amount.

According to such a sequence, the base station 1 can perform wireless LAN communication with the wireless communication terminal 2, and BLE communication with the power reception terminal 3, and can efficiently feed power to the power reception terminal 3.

Hereinafter, examples of a process of determining the number or combination of wireless transmitters to be used for power feeding in step S22, and a process of determining the amount of transmission power (wireless signal length), are specifically described.

Specific Example 1

In a case with a constraint condition pertaining to the power feeding time, such as designation of the upper limit value of the power feeding time or the range of the power feeding time, the number of wireless transmitters is determined so that the requested amount of power can be fed so as to satisfy the constraint condition. The controller 105 of the base station 1 determines the number of wireless transmitters required for power feeding, on the basis of the constraint condition, the transmission power of each wireless transmitter, and preliminarily obtained power efficiency information.

More specifically, first, if the transmission power of each wireless transmitter, the power conversion efficiency, and the transmission power time length (power feeding time length) are known, the amount of received power of the power reception terminal 3 can be calculated on the basis thereof. That is, the amount of transmitted transmission power is multiplied by the power conversion efficiency with respect to each wireless transmitter, and each product is totalized, which can calculate the amount of received power received by the power reception terminal 3. On the basis thereof, the amount of transmission power required to feed the requested amount of power is calculated. The number of wireless transmitters is determined so that the calculated amount of transmission power can be transmitted so as to satisfy the constraint condition. In this case, the number of wireless transmitters to be used is determined as small as possible, which can reduce the activation power for the wireless transmitters and save the frequency resource. For example, if the constraint condition is satisfied in a case of using one sub-transmitter and in a case of using two sub-transmitters, in addition to the main transmitter, use of one sub-transmitter can save the power required for sub-transmitter activation in comparison with use of two sub-transmitters and can require a smaller number of channels to be allocated to thereby allow the frequency resource to be saved.

The constraint condition pertaining to the power feeding time may be predefined, or may be designated from the power reception terminal 3 (for example, designated in step S11 or S12 in FIG. 3). Alternatively, the power reception terminal 3 may notify, to the base station 1, the degree of emergency, and the base station 1 may determine the constraint condition of the power feeding time according to the degree of emergency. For example, the higher the degree of emergency is, the lower the base station 1 reduces the upper limit value of the power feeding time.

The base station 1 may determine the constraint condition according to the remaining amount of power of the rechargeable battery 6 in the power reception terminal 3. For example, when the remaining amount of power is less than the threshold, the upper limit value of the power feeding time is determined to be low. When the amount is equal to the threshold or higher, the upper limit value is determined to be high. The base station 1 obtains the information on the remaining amount of power of the power reception terminal 3, and grasps the remaining amount of power of the power reception terminal 3 on the basis of the obtained information. The smaller the remaining amount of power of the rechargeable battery 6 is, the earlier the position of the power feeding time the base station 1 may set.

Specific Example 2

In the example 1, the channels used by the main transmitter 103 and the sub-transmitter 103_1 are different from each other. Alternatively, the channels may be the same. In this case, the power values of the received powers on the power receiving side are totalized on the same channel. That is, the total sum of the received powers of the wireless signals received from the main transmitter 103 and the sub-transmitter 103_1 becomes the received power of the power reception terminal 3.

The base station 1 preliminarily obtains the power conversion efficiencies in a case where at least a part of the wireless signal is transmitted from the predetermined number of wireless transmitters with respect to each number of wireless transmitters. In a case where the transmission powers are different among the wireless transmitters, the wireless signal may be transmitted with the set transmission powers with respect to each combination of the wireless transmitters, and the power conversion efficiency may be obtained. In a case where the transmission power values are adjustable with respect to each wireless transmitter, the power conversion efficiency may be obtained with respect to each combination of the setting values of the transmission power values. In a case of obtaining the power conversion efficiencies, the same weight of the antennas for each wireless transmitter is used among the wireless transmitters, for example.

The measurement of the power conversion efficiency may be performed by the base station 1 or the power reception terminal 3. In the case of measurement by the base station 1, at least a part of the wireless signal is simultaneously transmitted from the wireless transmitters with respect to each number of wireless transmitters or each combination of wireless transmitters. The power reception terminal 3 feeds back the received power value (or the amount of received power). The base station 1 divides the fed back received power value (or the amount of received power) by the total sum of the transmission power values (or the amounts of received power) used for transmitting the wireless signal. Accordingly, the power conversion efficiency is obtained with respect to each number of transmitters or each combination.

Figure 5:
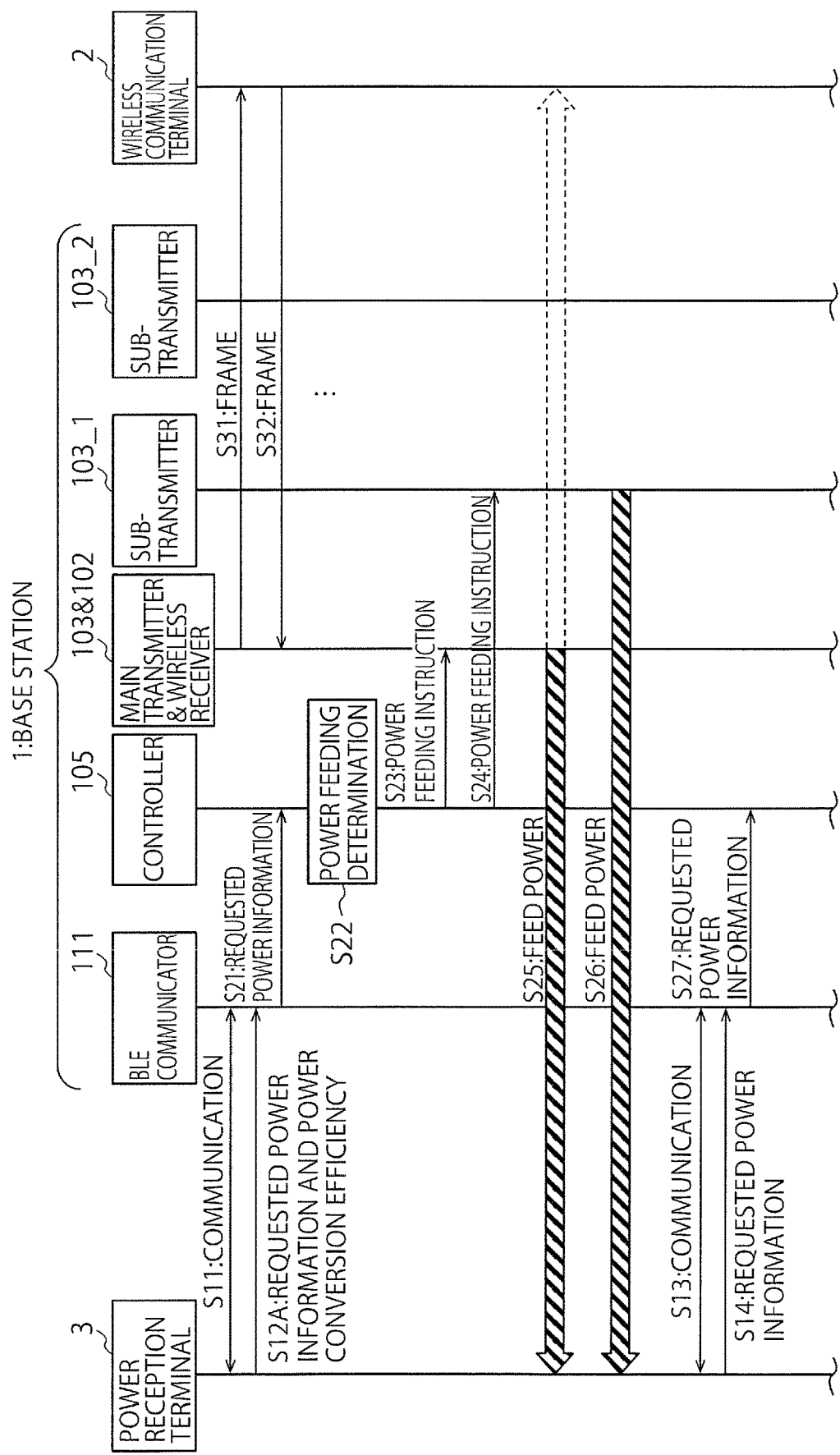
FIG. 5 is a sequence diagram of another operation example of the wireless communication system in FIG. 2.

On the other hand, in the case where the power conversion efficiency is measured by the power reception terminal 3, the power reception terminal 3 divides the received power value (or the amount of received power) by the total sum of the received power values (or the amounts of received power) used by the base station 1 to transmit the wireless signal, thereby obtaining the power conversion efficiency. The value of the measured power conversion efficiency may be notified to the base station 1 in step S11, S13 or the like in FIG. 3. Alternatively, the value may be notified by including the value in the power feeding request when the power feeding request is transmitted in step S12 or S14 in FIG. 3. FIG. 5 shows a sequence diagram in the latter case. In FIG. 5, in steps S12A and S14A, the power reception terminal 3 transmits the power feeding request that includes the requested power information and the power conversion efficiency.

Specific Example 3

The higher the power conversion efficiency, the more efficient in view of power consumption and the higher the possibility of power feeding in a short time. Accordingly, the number or combination of wireless transmitters to be used may be determined so that the power conversion efficiency can be the threshold or higher. Here, the power conversion efficiency varies according to the received power.

Figure 6:
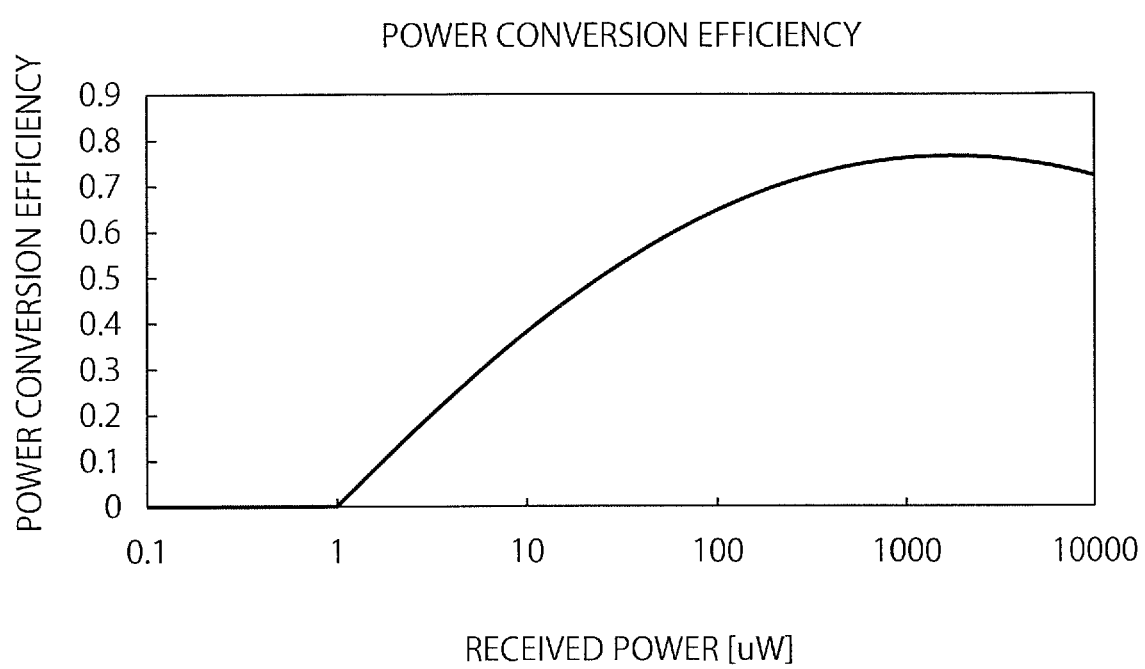
FIG. 6 is a graph showing the relationship between the received power and the power conversion efficiency.

FIG. 6 shows an example of the relationship between the power conversion efficiency and the received power value. The abscissa axis indicates the received power, and the ordinate axis indicates the power conversion efficiency. Until the received power reaches about 1 [$\mu$W], the power conversion efficiency is 0. Until the power slightly exceeds 1,000 [$\mu$W] after the power exceeds 1 [$\mu$W], the higher the received power is, the higher the power conversion efficiency is. After the power slightly exceeds 1,000 [$\mu$W], the power conversion efficiency gradually becomes low.

In this specific example, as with the specific example 2, it is assumed that the channel used by each wireless transmitter is the same and the transmission power of each wireless transmitter is also the same. The base station 1 obtains the power conversion efficiencies in a case where at least a part of the wireless signal is simultaneously transmitted from the wireless transmitters with respect to each number or each combination of wireless transmitters. The base station 1 generates association information that associates the number or combination of wireless transmitters and the power conversion efficiency, and holds the generated association information in the storage or the buffer in the controller 105.

When the base station 1 determines the number or combination of wireless transmitters, this station refers to the association information, and determines the number of wireless transmitters or the combination from among the numbers and combinations that have a power conversion efficiency of the threshold or higher.

In a case where the transmission power value of each wireless transmitter is adjustable, the power conversion efficiency may be obtained with respect to each combination of the setting values of the transmission power in the wireless transmitter. The association information that associates the combination of the setting values with the power conversion efficiencies is generated. The base station 1 refers to the association information, selects the combination having a power conversion efficiency of the threshold or higher, and selects the wireless transmitter associated with the selected combination. The transmission power indicated by the selected combination is set in the selected wireless transmitter.

This example assumes the case of using the multiple wireless transmitters. However, a case where the number of wireless transmitters to be used is one is not excluded. In this case, the power conversion efficiencies for multiple transmission power values may be obtained, the transmission power value that can obtain the power conversion efficiency of the threshold or higher may be selected, and the selected transmission power value may be set in the wireless transmitter.

Specific Example 4

There are a case where the base station 1 is required to communicate with the wireless communication terminal 2 with priority, and a case where communication with the wireless communication terminal 2 is preliminarily scheduled. In such cases, the base station 1 determines the number or combination of wireless transmitters and the power feeding time so that the requested amount of power can be fed to the power reception terminals 3 in a time period (available time period) other than the time period required for communication with the wireless communication terminal 2. A specific method is analogous to that in the case of using the time length of the available time period as the constraint condition in the example 1. In this case, the power feeding (wireless signal transmission) may be performed not necessarily in a continuous time period but also in divided time periods.

Figure 7:
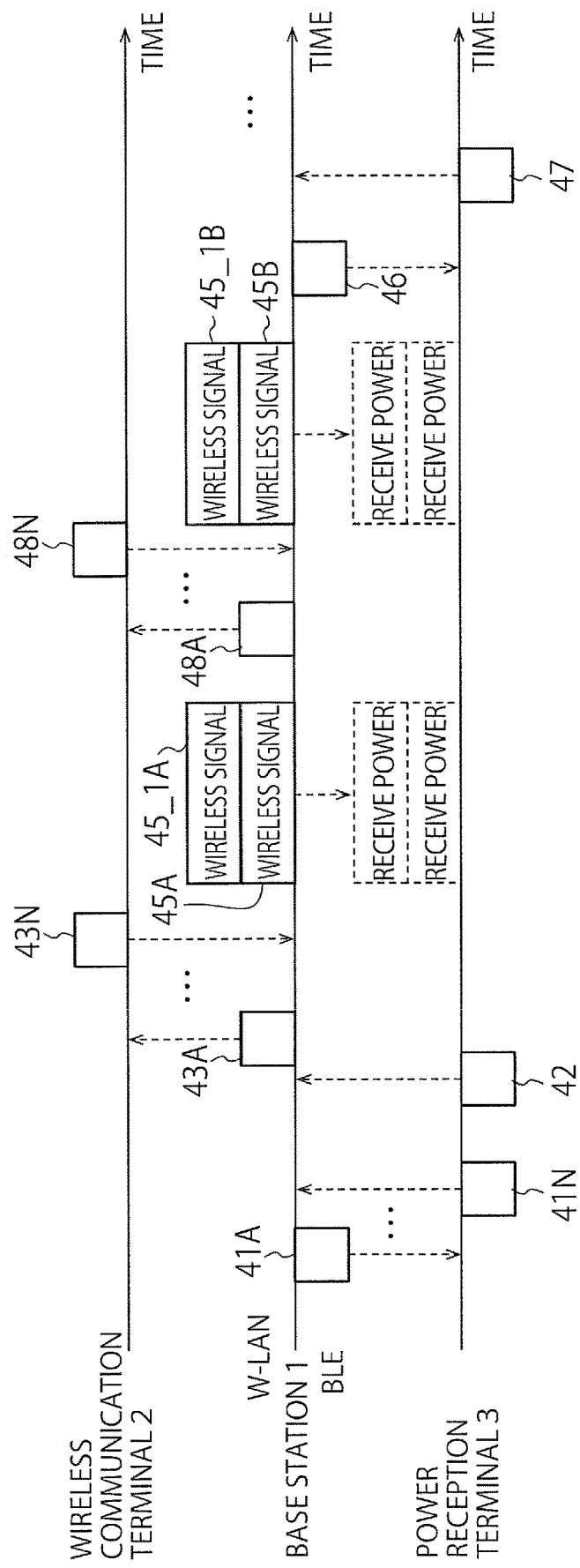
FIG. 7 is a diagram showing a sequence example in a case of power feeding in multiple divided time periods.

FIG. 7 is a diagram showing a sequence example in the case of power supply in the divided time periods. The wireless signal transmission from the main transmitter 103 and the sub-transmitter 103_1 is performed in two divided times. First, wireless signals 45A and 45_1A are transmitted from the main transmitter 103 and the sub-transmitter 103_1. Subsequently, communication with the wireless communication terminal 2 (transmission and reception of frames 48A to 48N) is performed, and then wireless signals 45B and 45_1B are transmitted from the main transmitter 103 and the sub-transmitter 103_1 in the second time. Power feeding is performed in the divided manner as described above, thereby allowing power to be fed effectively utilizing the available time period.

Figure 8:
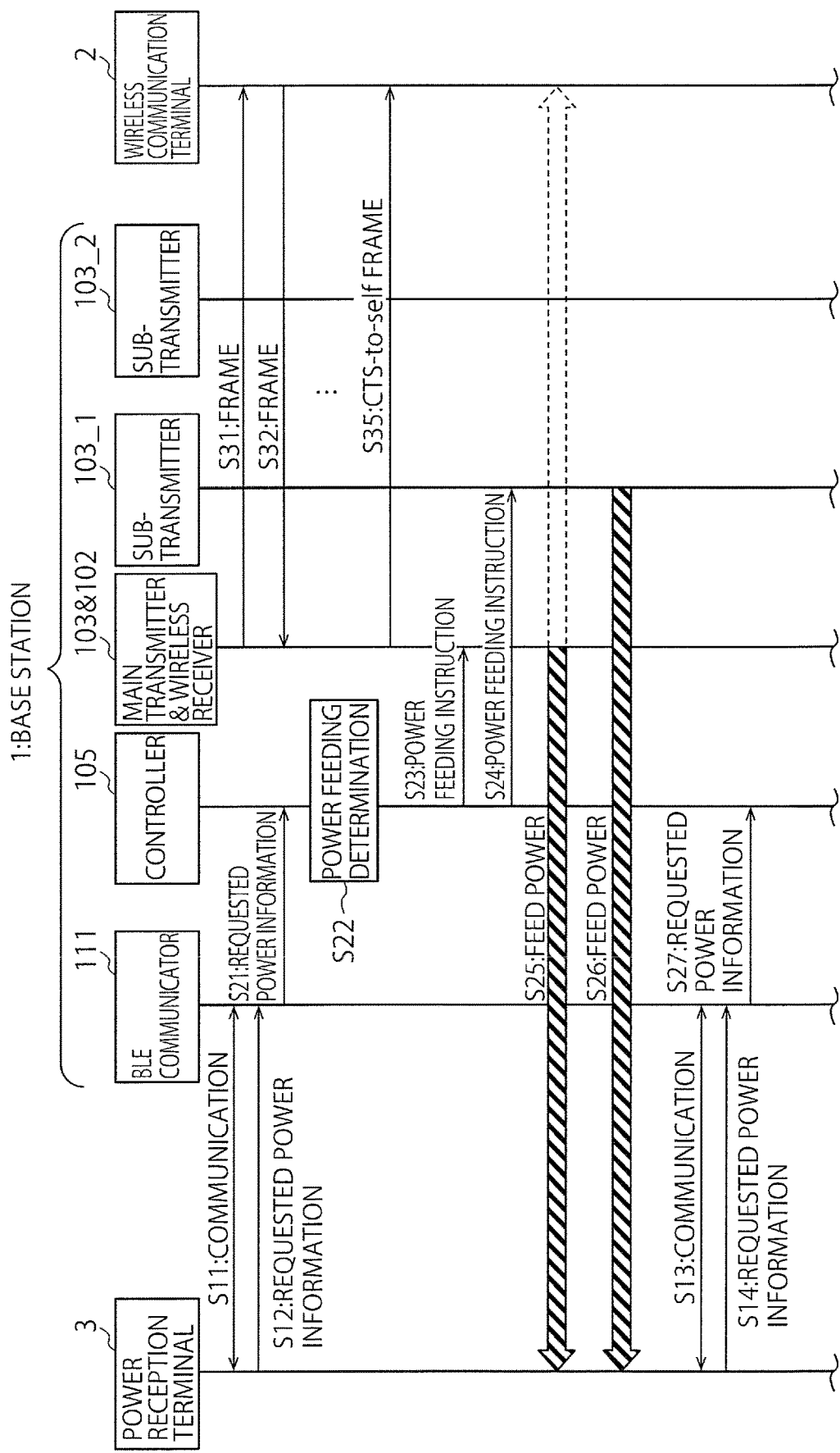
FIG. 8 is a sequence diagram of another operation example of the wireless communication system in FIG. 2.
Figure 9:
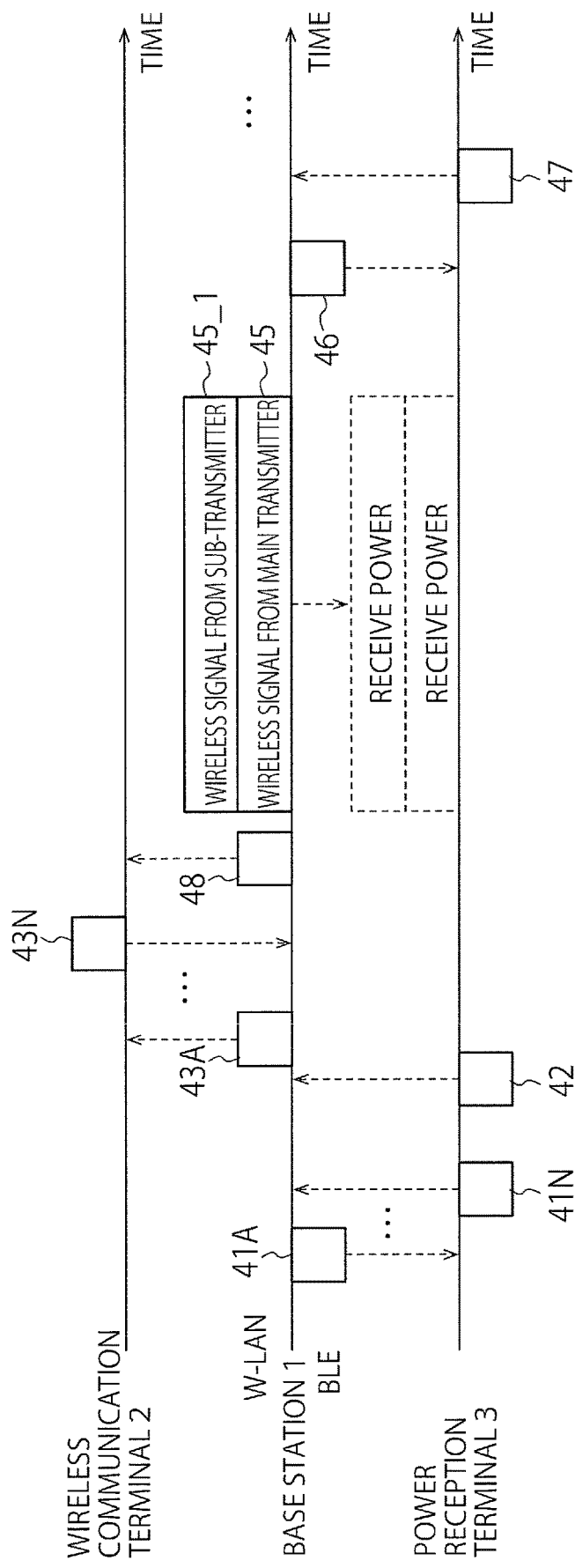
FIG. 9 is a diagram showing a sequence example of signal transmission and reception corresponding to FIG. 8.

FIG. 8 shows yet another example of the sequence according to this embodiment. FIG. 9 shows a sequence example of transmission and reception between the base station, the power reception terminal and the wireless communication terminal, and corresponds to the operation sequence of FIG. 8. According to this sequence, before transmission of the wireless signal of power feeding, a transmission right for the power feeding time or longer is obtained, and the wireless signal is transmitted based on the obtained transmission right. An example that obtains TXOP (Transmission Opportunity) as the transmission right is described. The example is different from the sequence of FIG. 3 in that before steps (S23 and S24) where the controller 105 outputs power feeding instruction signals, a step S35 is added where this controller performs process of obtaining the transmission right for the power feeding time or longer.

In step S35 in FIG. 8, a CTS-to-self frame 48 is transmitted from the main transmitter 103. The CTS-to-self frame is a CTS frame whose receiving address (RA) is the MAC address of the own station. The duration length to be secured is designated as TXOP in a Duration/ID field in the CTS-to-self frame 48. The wireless communication terminal 2 having received the CTS-to-self frame 48, suppresses transmission for the designated duration after completion of receipt of the CTS-to-self frame 48. That is, the wireless communication terminal 2 sets NAV (Network Allocation Vector) for the designated duration, and withholds from transmission during this duration. This duration is called a transmission prohibition duration or an NAV duration. Setting the NAV can prevent the power reception terminal 3 and the base station 1 from receiving the signal from the wireless communication terminal 2, and prevent transmission of the wireless signal of power feeding from interfering with the communication of the wireless communication terminal 2. Also in a case of measuring the power conversion efficiency described above, the NAV is set in an analogous manner, which can obtain a measurement result with high accuracy.

Here, the CTS-to-self frame is transmitted to obtain TXOP. Alternatively, another type of frame may be transmitted. For example, a frame for securing the duration during which the wireless medium is used (herein called a trigger frame) is defined. The duration length to be secured is set in a predetermined field (the field may be the Duration/ID field, frame body field, or another field) of the trigger frame, and the receiving address is set to the broadcast address or a multicast address, and the frame is transmitted. Upon receipt of the trigger frame, the wireless communication terminal 2 withholds from transmission for the duration set in the predetermined field after completion of receipt of the frame.

Figure 10:
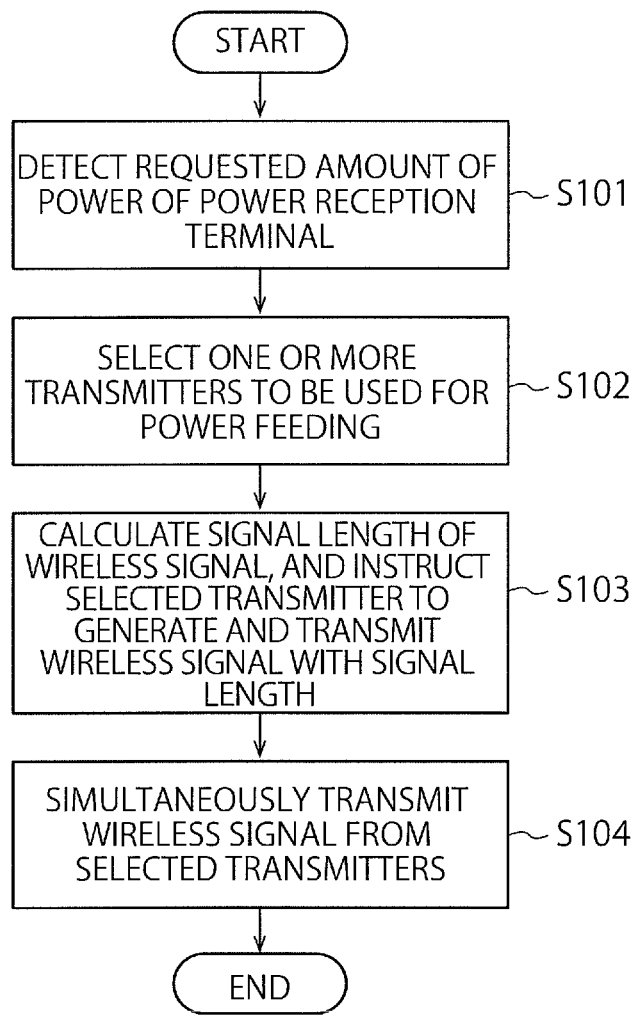
FIG. 10 is a flowchart of one example of an operation of a base station.

FIG. 10 is a flowchart of the operation of the base station 1 according to this embodiment. The base station 1 executes a power feeding method according to this embodiment by executing this flowchart. The base station 1 receives the requested power information from the power reception terminal 3, and grasps the requested amount of power of the power reception terminal 3 (S101).

The base station 1 selects the transmitter used for power feeding from among the main transmitter 103 and the sub-transmitters 103_1 to 103_n (S102). Selection of the main transmitter 103 with priority may be adopted as a requirement. Alternatively, it may be permitted that without such a requirement, multiple sub-transmitters are selected and the main transmitter 103 is not selected, for example. If there is a constraint condition, such as a constraint condition pertaining to the power feeding time or a constraint condition pertaining to the power conversion efficiency, for selection, the transmitters are selected so as to satisfy the constraint condition.

The base station 1 performs calculation based on the requested amount of power, calculates the amount of transmission power to be transmitted by the selected transmitters, and calculates the signal length of the wireless signal corresponding to the calculated amount of transmission power. Furthermore, this station sets the channel to be used for power feeding, in each transmitter. This station then outputs, to each transmitter, a power feeding instruction signal for instruction of generating and transmitting the wireless signal with the calculated signal length (S103). It is assumed that each transmitter has the same transmission power value. The value may be configured to be adjustable. It is assumed that each transmitter has the same wireless signal length. Alternatively, the length may be different. Before the power feeding instruction signal is transmitted to each transmitter, a process of securing the access right (transmission right) to the wireless medium may be performed.

Each transmitter generates the wireless signal on the basis of the power feeding instruction signal, and transmits the generated wireless signal to the power reception terminal 3 (S104). Each transmitter transmits the wireless signal through a beam with the directivity being formed toward the power reception terminal 3.

According to this embodiment, one or more transmitters are selected from among the main transmitter 103 and the sub-transmitters 103_1 to 103_n, and at least a part of the wireless signal of power feeding is simultaneously transmitted from the selected transmitters, thereby allowing the power reception terminal to be fed with power so as to satisfy the constraint condition (the constraint condition pertaining to the power feeding time length or the power conversion efficiency).

For example, even in a case where the power feeding for the power reception terminal 3 cannot be completed in the constraint time only with a single transmitter, simultaneous use of two or more transmitters can feed power in the constraint time. Even in a case where only power feeding with low power conversion efficiency can be achieved with a single transmitter, simultaneous use of multiple transmitters can increase the received power value at the power reception terminal and feed power with high power conversion efficiency is possible. The high power conversion efficiency exerts the advantageous effects of power feeding in a short time and reduction in power consumption. A time period during which power feeding is not performed is identified, and communication is performed with the wireless communication terminal 2 in the identified time period, thereby allowing power feeding and wireless LAN communication to be efficiently achieved at the same time.

Second Embodiment

Figure 11:
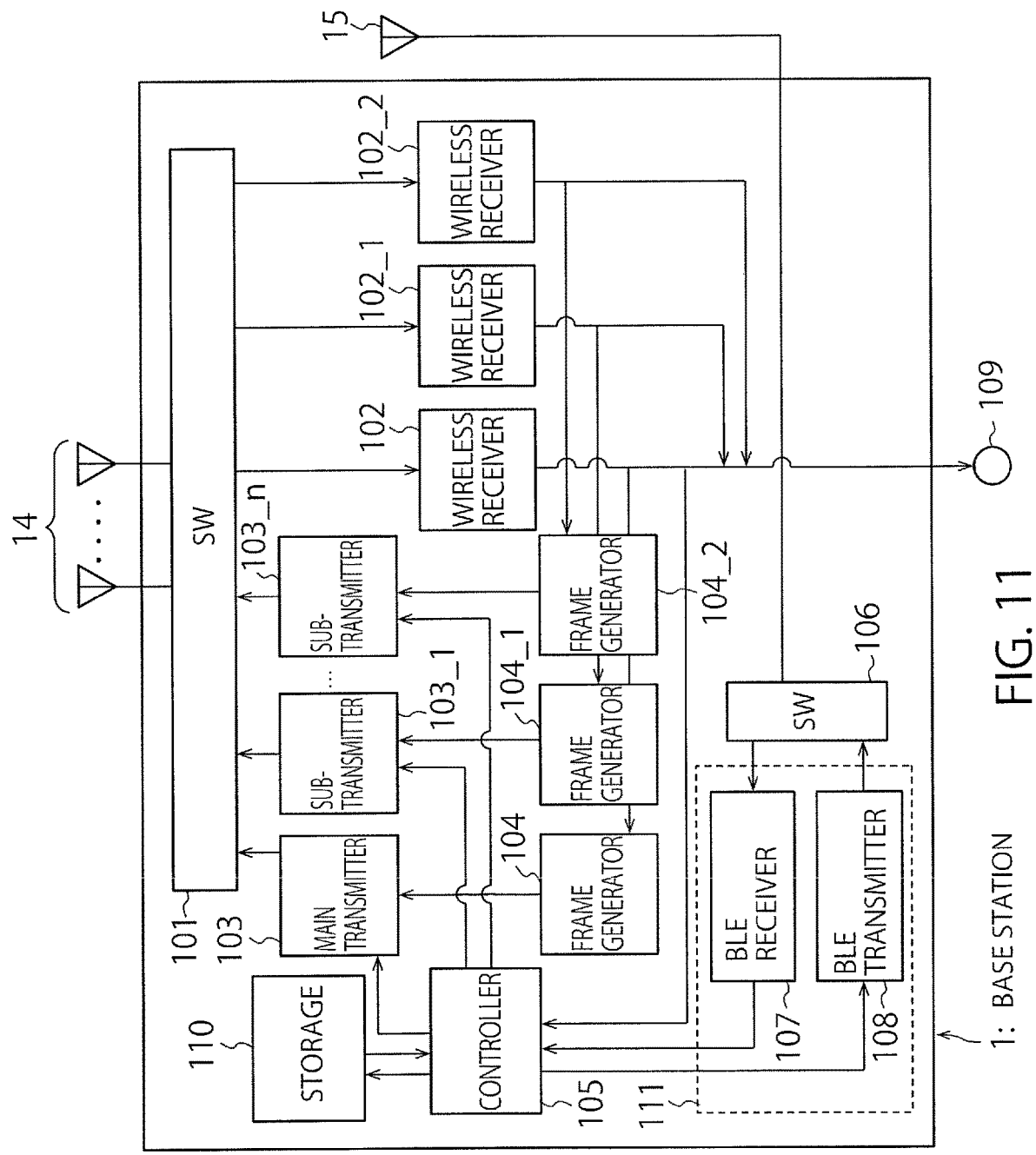
FIG. 11 is a block diagram of a wireless communication system according to a second embodiment.

FIG. 11 shows a block diagram of a base station 1 according to this embodiment. The configurations of the power reception terminal 3 and the wireless communication terminal 2 are analogous to those in the first embodiment. Consequently, illustration thereof is omitted.

In the first embodiment, only the wireless transmitter (main transmitter) 103 has a function of communication (wireless LAN communication) with the wireless communication terminal 2, but the wireless transmitters (sub-transmitters) 103_1 to 103_*n* do not have the function of wireless LAN communication. In this embodiment, the wireless transmitters (sub-transmitters) 103_1 to 103_*n* have the function of wireless LAN communication. In conformity with the wireless transmitters (sub-transmitters) 103_1 to 103_*n*, wireless receivers 102_1 to 102_*n* and frame generators 104_1 to 104*n* are also mounted on the base station 1. The wireless receivers 102_1 to 102_*n* have a function analogous to that of the wireless receiver 102 in FIG. 2. The frame generator 104_1 to 104*n* have a function analogous to that of the frame generator 104 in FIG. 2. For example, the combinations of the wireless transmitters, the frame generators and the wireless receivers correspond to the respective wireless communicators (wireless communication circuits) W_1 to W_n. Different MAC addresses are allocated to the wireless communicators W_1 to W_n, which perform wireless LAN communication. The wireless transmitters 103 and 103_1 to 103_*n* in the wireless communicators 1 to n transmit the wireless signal of power feeding, as with the first embodiment.

It may be configured such that only some sub-transmitters among the sub-transmitters 103_1 to 103_*n* have the wireless LAN communication function. In this case, the wireless receivers and the frame generators corresponding to the remaining sub-transmitters may be omitted.

As with the first embodiment, the controller 105 of the base station 1 selects the wireless transmitters to be used for power feeding from among the wireless transmitters 103 and 103_1 to 103_*n*, and the wireless signal is transmitted using the selected wireless transmitters.

The controller 105 uses the wireless transmitters that are not used for power feeding among the wireless transmitters 103 and 103_1 to 103_*n* to communicate with the wireless communication terminal 2 in parallel to power feeding through the wireless transmitters selected above.

Figure 12:
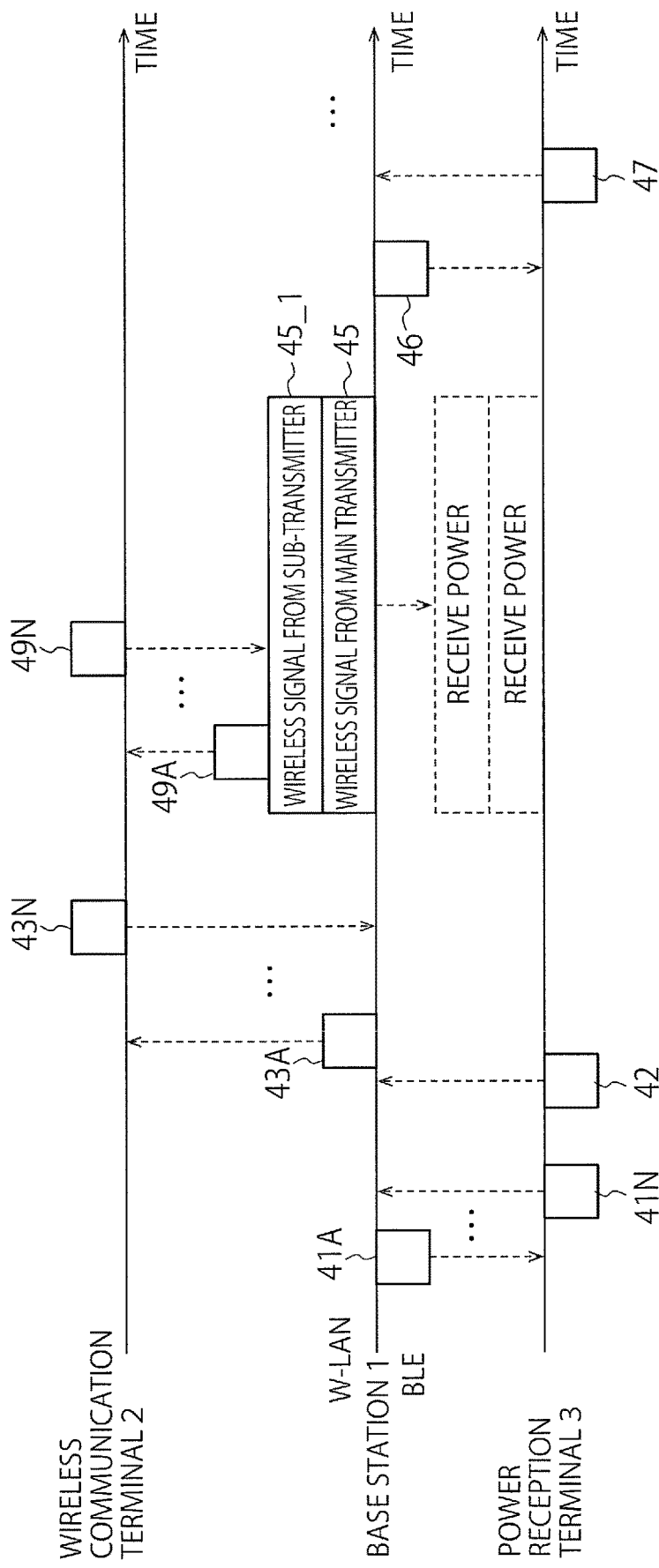
FIG. 12 is a diagram showing a sequence example of the operation according to the second embodiment.

FIG. 12 shows an example of the sequence according to this embodiment. The base station 1 uses the wireless transmitter 103 to communicate with the wireless communication terminal 2 (transmission and reception of frames 43A to 43N). It is assumed that this communication uses the channel 1. It is assumed that in the middle of the process, for power feeding to the power reception terminal 3, the wireless transmitter (sub-transmitter) 103_1 is selected, and the wireless transmitter (main transmitter) 103 and the wireless transmitter (sub-transmitter) 103_1 transmit the wireless signals 45 and 45_1. It is herein assumed that the wireless transmitter (main transmitter) 103 and the wireless transmitter (sub-transmitter) 103_1 use the channel 1.

At this time, the controller 105 of the base station 1 determines to communicate with the wireless communication terminal 2 using, for example, the wireless communicator W_2 (the wireless transmitter 103_2, the frame generator 104_2 and the wireless receiver 102_2) among the wireless communicators (wireless communication circuits) W_2 to W_n. The controller 105 determines a channel to be allocated to the wireless communicator W_2 (the wireless transmitter 103_2, the frame generator 104_2 and the wireless receiver 102_2) from among the channels other than the channel 1, and sets the determined channel in the wireless communicator W_2. It is herein assumed that the channel 2 is determined.

The controller 105 notifies, to the wireless communication terminal 2, a channel change notification for specifying the determined channel 2. The notification may be performed from the wireless transmitter 103 in the channel 1, or from wireless transmitter 103_1 in the channel 2. The wireless communication terminal 2 having received the channel change notification switches the channel to be used from the channel 1 to the channel 2, and communicates with the base station 1 in the channel 2 (transmission and reception of the frames 49A to 49N). Here, communication is performed with the same wireless communication terminal before and after the channel is changed. Alternatively, communication may be performed with another wireless communication terminal after the channel is changed.

According to this embodiment, even in the case where the wireless communicator (main transmitter) 103 is used for power feeding, the communication with the wireless communication terminal 2 can be continued using another wireless communicator (sub-transmitter).

Third Embodiment

In the first and second embodiments, the wireless transmitters 103 and 103_1 to 103_*n* are arranged in the housing of the base station 1. Alternatively, some or all the sub-transmitters 103_1 to 103_*n* may be arranged in another housing. For example, in a case where there are three sub-transmitters, the three sub-transmitters may be arranged in separate housings. Alternatively, two sub-transmitters and one sub-transmitter may be separated, and arranged in separate housings. In the case where the sub-transmitters are arranged in the separate housings, the controller 105 transmits an instruction signal to the sub transmitter in the other housing through a wireless or wired communicator (communication circuit), thereby allowing an operation analogous to the operations in the first and second embodiments to be achieved. Hereinafter, this embodiment is described in detail.

Figure 13:
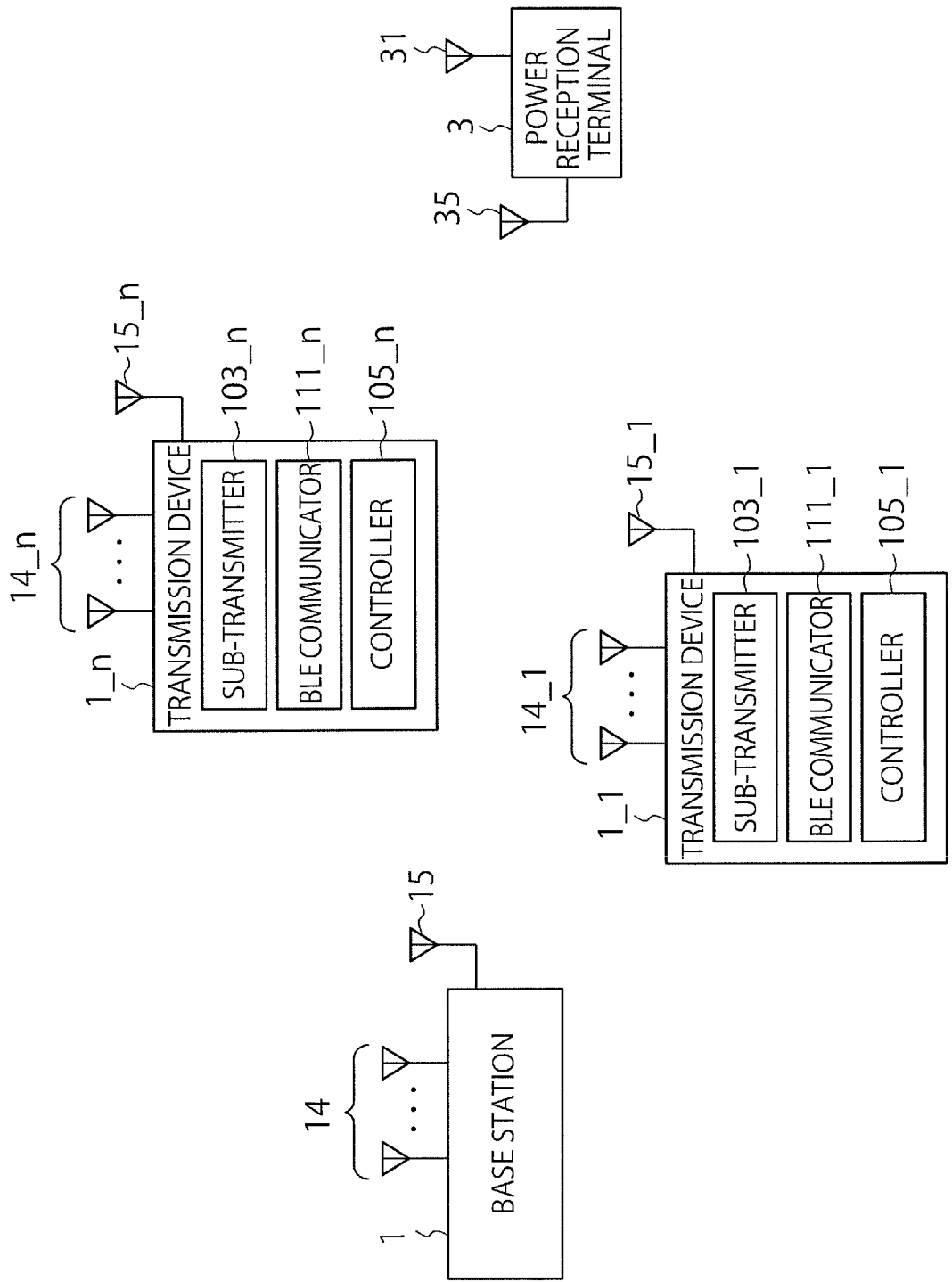
FIG. 13 is a block diagram of a wireless communication system according to a third embodiment.

FIG. 13 shows the base station 1, multiple transmission devices 1_1 to 1_n, and the power reception terminals 3 according to this embodiment. Illustration of the wireless communication terminal 2 is omitted.

The base station 1 has a configuration analogous to the configuration in FIG. 2 from which the sub-transmitters are removed. The base station 1 has a function of a control device for controlling power feeding by controlling the transmission devices 1_1 to 1_n. The transmission devices 1_1 to 1_n respectively includes antennas 14_1 to 14_n for wireless LAN, and antennas 15_1 to 15_n for BLE, and further includes wireless transmitters (sub-transmitters) 103_1 to 103_n, BLE communicators 111_1 to 111_n, and controllers 105_1 to 105_n. The number of antennas 14_x (x is a value ranging from 1 to n, inclusive) for wireless LAN included in each transmission device may be one or more. Likewise, the number of antennas for BLE 15_x may be one or more. The sub-transmitters 103_1 to 103_n have a function analogous to that of the transmitters (sub-transmitter) 103_1 to 103_n in FIG. 2. The BLE communicators 111_1 to 111_n communicate with the BLE communicator 111 of the base station 1 and the BLE communicator of the power reception terminal 3 (the BLE transmitter 34 and the BLE receiver 37) through BLE.

The base station 1 outputs the power feeding instruction signal to the transmission devices 1_1 to 1_n. The controller of each of the transmission devices 1_1 to 1_n has a function of estimating the BLE direction, and can estimate the direction of the power reception terminal 3.

Note that instead of the direction estimation, wireless LAN may be used.

Each of the transmission devices 1_1 to 1_n can form the directivity to the power reception terminal 3, and transmit the wireless signal. Each transmission device 1_x (x is an integer ranging from 1 to n) may assign weights to the multiple antennas 14_x (x is an integer ranging from 1 to n), and transmit the wireless signal through the beam having the directivity to the power reception terminal 3. Alternatively, the antenna 14_x may be an antenna having a variable directivity. A pattern having the directivity to the power reception terminal 3 may be set to the antennas, and the wireless signal may be transmitted.

According to this embodiment, the base station 1 can feed power, additionally using transmission devices therearound. Consequently, even in a case where it is difficult to feed power to the power reception terminal 3 satisfying the constraint condition only through power feeding by the base station 1 itself, the base station 1 causes the transmission devices therearound to feed power simultaneously, thereby allowing such power feed. Note that a mode is adoptable where some or all the transmission devices 1_1 to 1_n are shared by other base stations.

Fourth Embodiment

Figure 14:
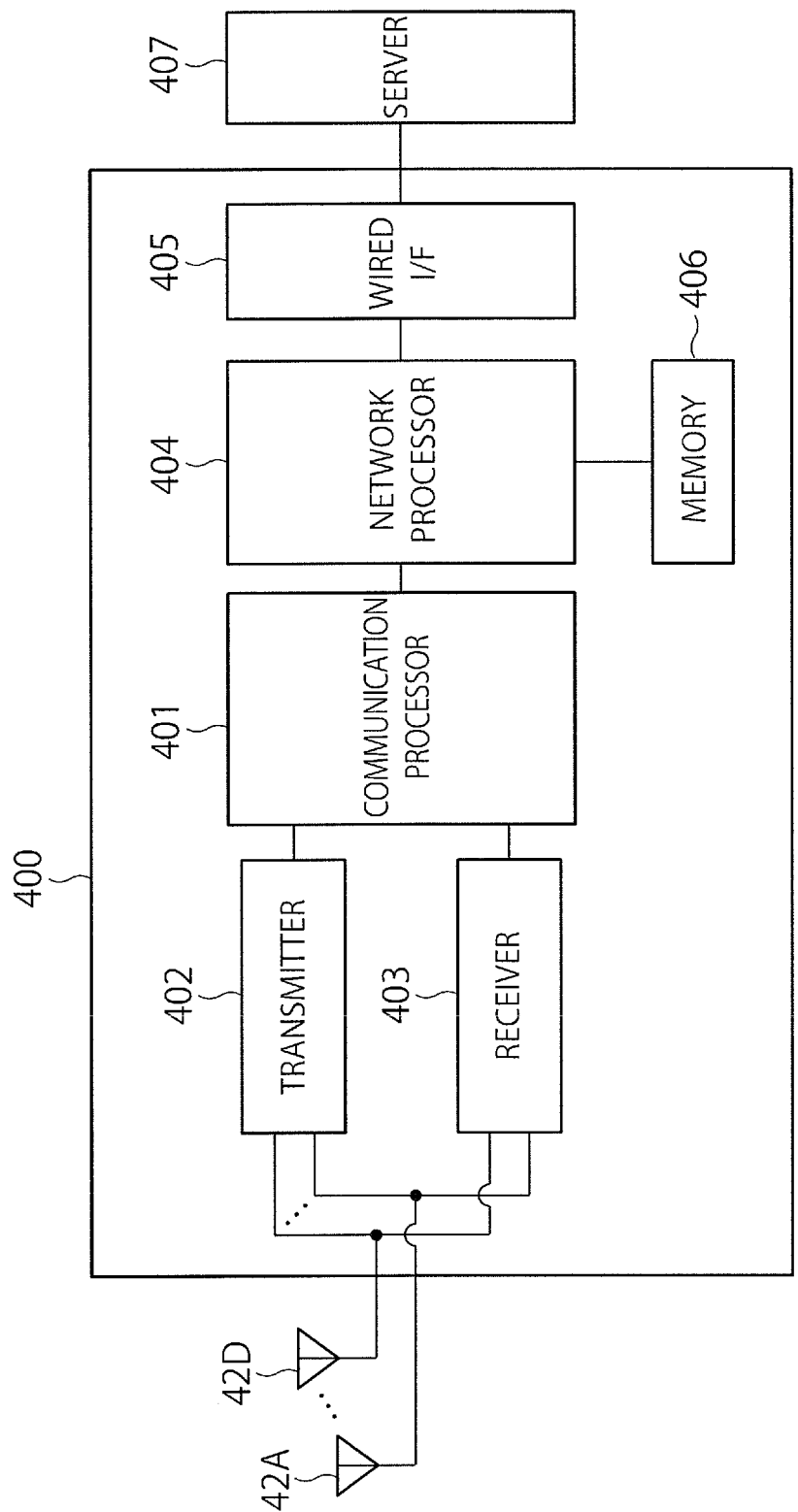
FIG. 14 is a functional block diagram of an access point or a terminal.

FIG. 14 is a functional block diagram of a base station (access point) 400 according to the present embodiment. The access point includes a communication processor 401, a transmitter 402, a receiver 403, antennas 42A, 42B, 42C, and 42D, a network processor 404, a wired I/F 405, and a memory 406. The access point 400 is connected to a server 407 through the wired I/F 405. At least a former of the communication processor 401 and the network processor 404 has functions similar to the controller in the first embodiment. The transmitter 402 and the receiver 403 have functions similar to the transmitter and the receiver described in the first embodiment. Alternatively, the transmitter 402 and the receiver 403 may perform analog domain processing in the transmitter and the receiver and the network processor 404 may perform digital domain processing in the transmitter and the receiver in the first embodiment. The network processor 404 has functions similar to the upper layer processor. The communication processor 401 may internally possess a buffer for transferring data to and from the network processor 404. The buffer may be a volatile memory, such as an SRAM or a DRAM, or may be a non-volatile memory, such as a NAND or an MRAM.

The network processor 404 controls data exchange with the communication processor 401, data writing and reading to and from the memory 406, and communication with the server 407 through the wired I/F 405. The network processor 404 may execute a higher communication process of the MAC layer, such as TCP/IP or UDP/IP, or a process of the application layer. The operation of the network processor may be performed through processing of software (program) by a processor, such as a CPU. The operation may be performed by hardware or may be performed by both of the software and the hardware.

For example, the communication processor 401 corresponds to a baseband integrated circuit, and the transmitter 402 and the receiver 403 correspond to an RF integrated circuit that transmits and receives frames. The communication processor 401 and the network processor 404 may be formed by one integrated circuit (one chip). Parts that execute processing of digital areas of the transmitter 402 and the receiver 403 and parts that execute processing of analog areas may be formed by different chips. The communication processor 401 may execute a higher communication process of the MAC layer, such as TCP/IP or UDP/IP. Although the number of antennas is four here, it is only necessary that at least one antenna is included.

The memory 406 saves data received from the server 407 and data received by the receiver 402. The memory 406 may be, for example, a volatile memory, such as a DRAM, or may be a non-volatile memory, such as a NAND or an MRAM. The memory 406 may be an SSD, an HDD, an SD card, an eMMC, or the like. The memory 406 may be provided outside of the base station 400.

The wired I/F 405 transmits and receives data to and from the server 407. Although the communication with the server 407 is performed through a wire in the present embodiment, the communication with the server 407 may be performed wirelessly.

The server 407 is a communication device that returns a response including requested data in response to reception of a data forward request for requesting transmission of the data. Examples of the server 407 include an HTTP server (Web server) and an FTP server. However, the server 407 is not limited to these as long as the server 407 has a function of returning the requested data. The server 407 may be a communication device operated by the user, such as a PC or a smartphone. The server 407 may wirelessly communicate with the base station 400.

When the STA belonging to the BSS of the base station 400 issues a forward request of data for the server 407, a packet regarding the data forward request is transmitted to the base station 400. The base station 400 receives the packet through the antennas 42A to 42D. The base station 400 causes the receiver 403 to execute the process of the physical layer and the like and causes the communication processor 401 to execute the process of the MAC layer and the like.

The network processor 404 analyzes the packet received from the communication processor 401. Specifically, the network processor 404 checks the destination IP address, the destination port number, and the like. When the data of the packet is a data forward request such as an HTTP GET request, the network processor 404 checks whether the data requested by the data forward request (for example, data in the URL requested by the HTTP GET request) is cached (stored) in the memory 406. A table associating the URL (or reduced expression of the URL, such as a hash value or an identifier substituting the URL) and the data is stored in the memory 406. The fact that the data is cached in the memory 406 will be expressed that the cache data exists in the memory 406.

When the cache data does not exist in the memory 406, the network processor 404 transmits the data forward request to the server 407 through the wired I/F 405. In other words, the network processor 404 substitutes the STA to transmit the data forward request to the server 407. Specifically, the network processor 404 generates an HTTP request and executes protocol processing, such as adding the TCP/IP header, to transfer the packet to the wired I/F 405. The wired I/F 405 transmits the received packet to the server 407.

The wired I/F 405 receives, from the server 407, a packet that is a response to the data forward request. From the IP header of the packet received through the wired I/F 405, the network processor 404 figures out that the packet is addressed to the STA and transfers the packet to the communication processor 401. The communication processor 401 executes processing of the MAC layer and the like for the packet. The transmitter 402 executes processing of the physical layer and the like and transmits the packet addressed to the STA from the antennas 42A to 42D. The network processor 404 associates the data received from the server 407 with the URL (or reduced expression of the URL) and saves the cache data in the memory 406.

When the cache data exists in the memory 406, the network processor 404 reads the data requested by the data forward request from the memory 406 and transmits the data to the communication processor 401. Specifically, the network processor 404 adds the HTTP header or the like to the data read from the memory 406 and executes protocol processing, such as adding the TCP/IP header, to transmit the packet to the communication processor 401. In this case, the transmitter IP address of the packet is set to the same IP address as the server, and the transmitter port number is also set to the same port number as the server (destination port number of the packet transmitted by the communication terminal), for example. Therefore, it can be viewed from the STA as if communication with the server 407 is established. The communication processor 401 executes processing of the MAC layer and the like for the packet. The transmitter 402 executes processing of the physical layer and the like and transmits the packet addressed to the STA from the antennas 42A to 42D.

According to the operation, frequently accessed data is responded based on the cache data saved in the memory 406, and the traffic between the server 407 and the base station 400 can be reduced. Note that the operation of the network processor 404 is not limited to the operation of the present embodiment. There is no problem in performing other operation when a general caching proxy is used, in which data is acquired from the server 407 in place of the STA, the data is cached in the memory 406, and a response is made from the cache data of the memory 406 for a data forward request of the same data.

The base station (access point) according to the present invention can be applied for the base station in the above-stated any embodiment. The transmission of the frame, the data or the packet used in the any embodiment may be carried out based on the cached data stored in the memory 406. Also, information obtained based on the frame, the data or the packet received by the base station in the first to ninth embodiments may be cached in the memory 406. The frame transmitted by the base station in the first to ninth embodiments may include the cached data or information based on the cached data. The information based on the cached data may include information on a size of the data, a size of a packet required for transmission of the data. The information based on the cached data may include a modulation scheme required for transmission of the data. The information based on the cached data may include information on existence or non-existence of data addressed to the terminal, The base station (access point) according to the present invention can be applied for the base station in the above-stated any embodiment. In the present embodiment, although the base station with the cache function is described, a terminal (STA) with the cache function can also be realized by the same block configuration as FIG. 14. In this case, the wired I/F 405 may be omitted. The transmission, by the terminal, of the frame, the data or the packet used in the any embodiment may be carried out based on the cached data stored in the memory 406. Also, information obtained based on the frame, the data or the packet received by the terminal in the any embodiment may be cached in the memory 406. The frame transmitted by the terminal in the first embodiment may include the cached data or information based on the cached data. The information based on the cached data may include information on a size of the data, a size of a packet required for transmission of the data. The information based on the cached data may include a modulation scheme required for transmission of the data. The information based on the cached data may include information on existence or non-existence of data addressed to the terminal.

Fifth Embodiment

Figure 15:
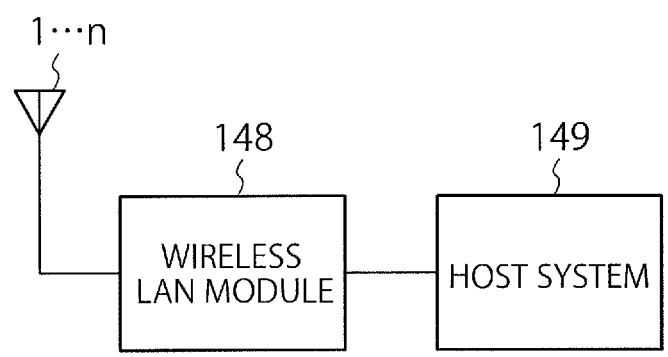
FIG. 15 is a diagram showing an example of the overall configuration of the terminal or the access point.

FIG. 15 shows an example of entire configuration of a terminal (WLAN terminal) or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to the first embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device, a vehicle and so on.

The wireless LAN module 148 (or the wireless communication device) may have functions of other wireless communication standards such as LTE (Long Term Evolution), LTE-Advanced (standards for mobile phones) as well as the IEEE802.11.

Figure 16:
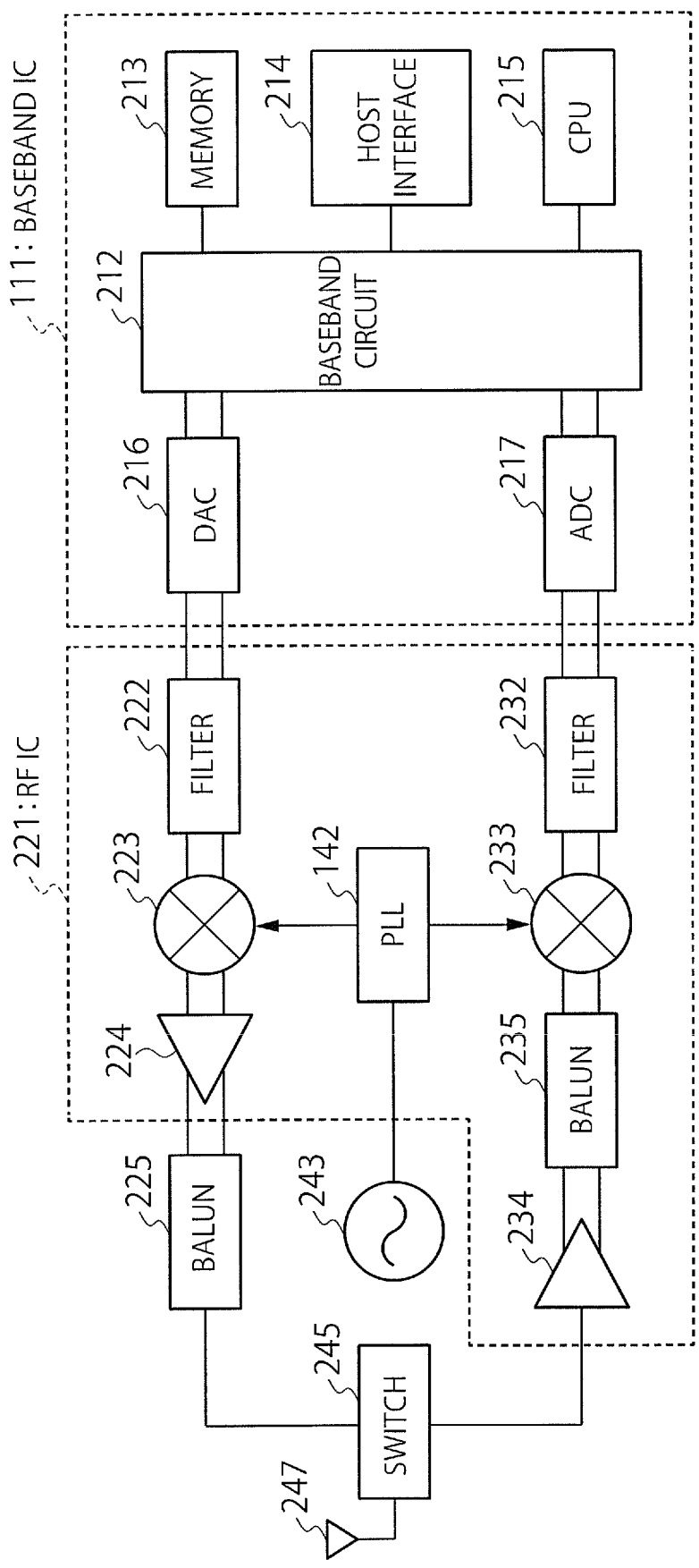
FIG. 16 is a diagram showing a hardware configuration example of a wireless communication device mounted on the terminal or the access point.

FIG. 16 shows an example of hardware configuration of an access point (base station), a WLAN terminal or a BLE terminal. When the WLAN and the BLE terminal are both provided, the configuration shown in the figure may be provided for each case and may be mounted. The functions of the WLAN and BLE may be mounted in one chip or may be arranged in a dispersed manner in different chips. All of elements shown in the figure are not required to be provided, a part of elements may be omitted or replaced, and another element may be added.

In the configuration shown in figure, at least one antenna 247 is included although a plurality of antennas are included. In this case, a plurality of sets of a transmission system (216 and 222 to 225), a reception system (217, 232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication device) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control apparatus that controls communication, the controller that controls communication, or controlling circuitry that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process (which may include MIMO modulation), and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be band pass filters or low pass filters.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the LNA 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

The antenna 247 may be a phased array antenna or a directivity variable antenna.

Sixth Embodiment

Figure 17:
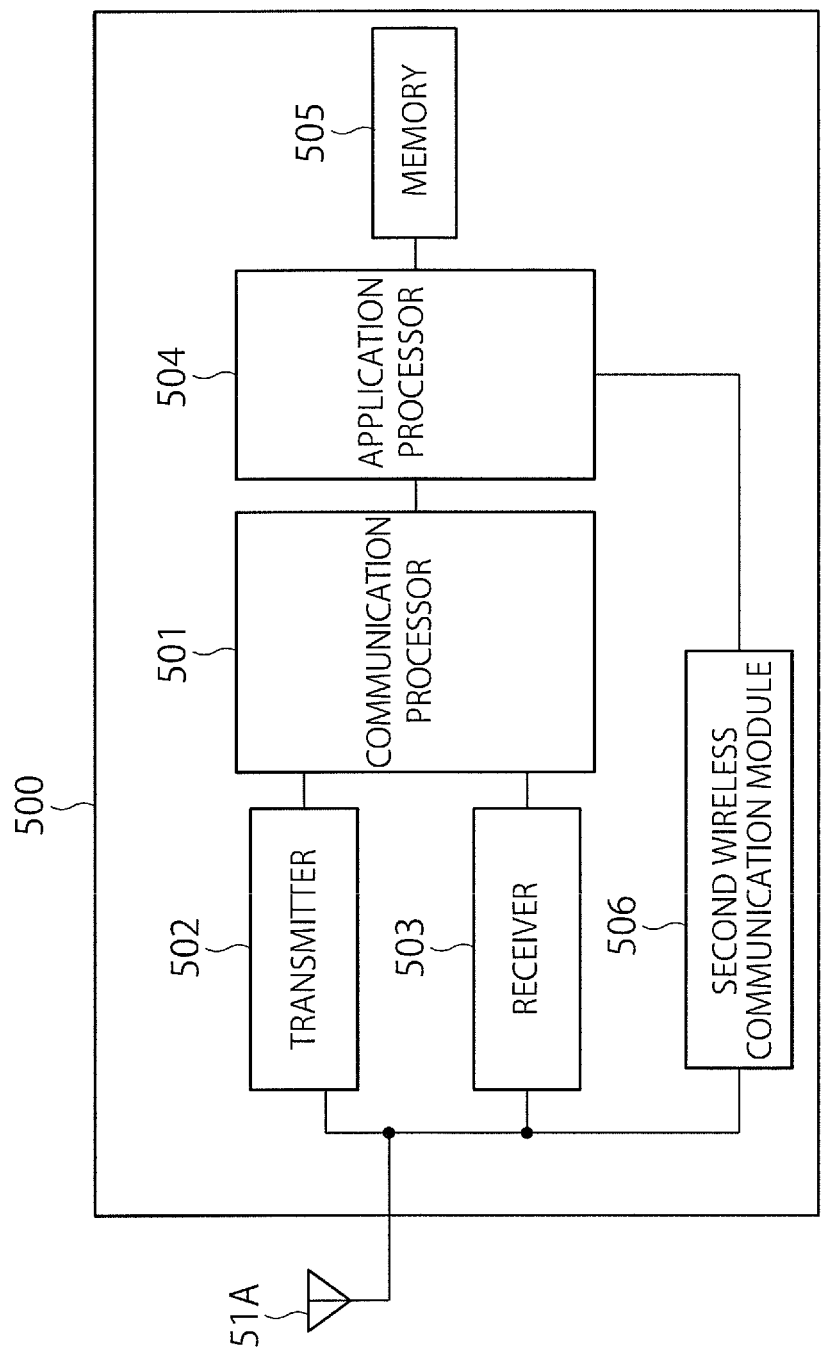
FIG. 17 is a functional block diagram of the terminal or the access point.

FIG. 17 is a functional block diagram of the terminal (STA) 500 according to a sixth embodiment. The STA 500 includes a communication processor 501, a transmitter 502, a receiver 503, an antenna 51A, an application processor 504 a memory 505, and a second wireless communication module 506. The base station (AP) may have the similar configuration.

The communication processor 501 has the functions similar to the controller as described in the first embodiment. The transmitter 502 and the receiver 503 have the functions similar to the transmitter and the receiver as described in the first embodiment. The transmitter 502 and the receiver 503 may perform analog domain processing in the transmitter and the receiver as described in the first embodiment and the communication processor 501 may perform digital domain processing in the transmitter and the receiver as described in the first embodiment. The communication processor 501 may internally possess a buffer for transferring data to and from the application processor 504. The buffer may be a volatile memory, such as an SRAM or a DRAM, or may be a non-volatile memory, such as a NAND or an MRAM.

The application processor 504 performs wireless communication through the communication processor 501, data writing or reading with the memory 505 and wireless communication through the second wireless communication module 506. The application processor 504 performs various processing such as Web browsing or multimedia processing of video or music or the like. The operation of application processor 504 may be carried out by software (program) processing by a processor such as CPU, by hardware, or both of them.

The memory 505 saves data received at the receiver 503 or the second wireless communication module 506, or data processed by the application processor 504. The memory 505 may be a volatile memory such as a DRAM or may be a non-volatile memory, such as a NAND or an MRAM. The memory 505 may be an SSD, an HDD, an SD card, or an eMMC or the like. The memory 505 may be arranged out of the access point 500.

The second wireless communication module 506 have the similar configuration to the WLAN module as shown in FIG. 15 or FIG. 16 as one example. The second wireless communication module 506 performs wireless communication in a different manner than that realized by the communication processor 501, the transmitter 502 and the receiver 503. For example, in a case that the communication processor 501, the transmitter 502 and the receiver 503 perform wireless communication in compliance with IEEE802.11 standard, the second wireless communication module 506 may perform wireless communication in compliance with another wireless communication standard such as Bluetooth (trademark), LTE, Wireless HD or the like. The communication processor 501, the transmitter 502, the receiver 503 may perform wireless communication at 2.4 GHz/5 GHz and the second wireless communication module 506 may perform wireless communication at 60 GHz.

In the embodiment, one antenna is arranged and shared by the transmitter 502, the receiver 503 and the second wireless communication module 506. A switch controlling for connection destination of the antenna 51A may be arranged and thereby the antenna may be shared. A plurality of antennas may be arranged and may be employed by the transmitter 502, the receiver 503, and the second wireless communication module 506, respectively.

As one example, the communication processor 501 corresponds to an integrated circuit, and the transmitter 502 and the receiver 503 corresponds to an RF integrated circuit which transmits and receives frames. A set of the communication processor 501 and the application processor 504 is configured by one integrated circuit (1 chip). A part of the second wireless communication module 506 and the application processor 504 may be configured by one integrated circuit (1 chip).

The application processor performs control of wireless communication through the communication processor 501 and wireless communication through the second wireless communication module 506.

Seventh Embodiment

Figure 18A:
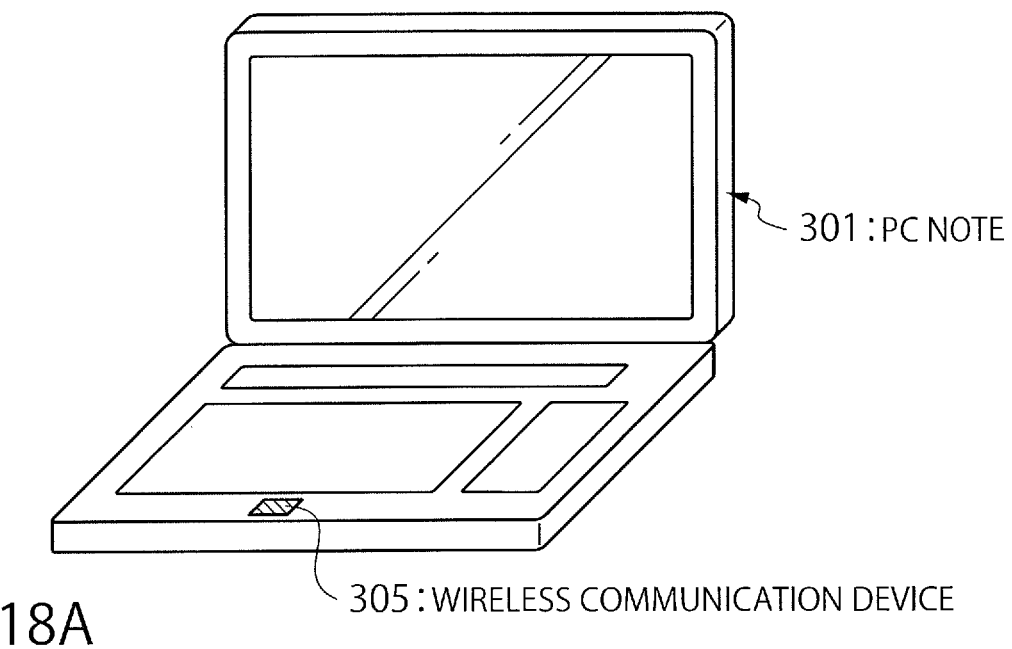
FIGS. 18A and 18B each is a perspective view of the terminal according to the embodiment of the present invention.
Figure 18B:
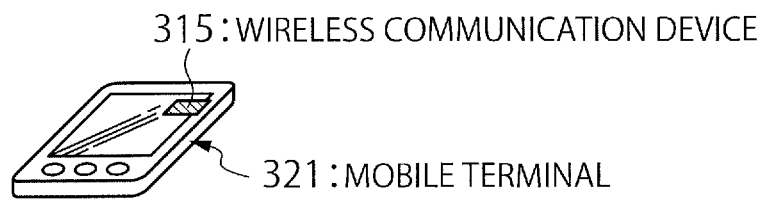

FIG. 18A and FIG. 18B are perspective views of wireless terminal according to the present embodiment. The wireless terminal in FIG. 18A is a notebook PC 301 and the wireless communication device (or a wireless device) in FIG. 18B is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device, a vehicle and so on.

Figure 19:
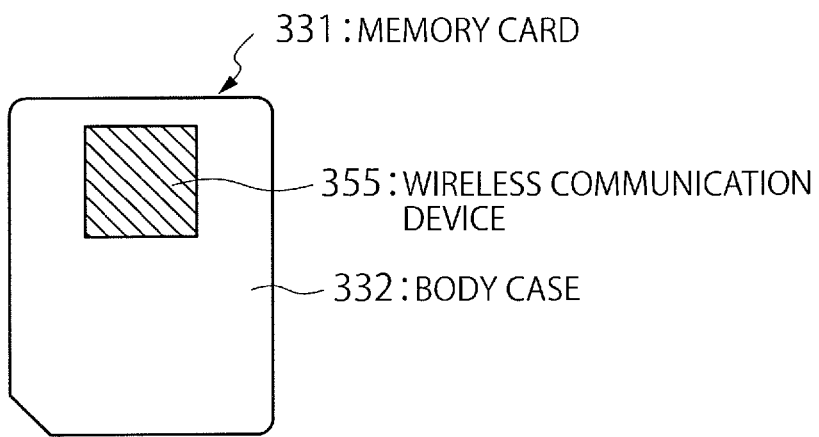
FIG. 19 is a diagram showing a memory card according to the embodiment of the present invention.

Moreover, a wireless communication device installed in a terminal (which may indicate a base station) can also be provided in a memory card. FIG. 19 illustrates an example of a wireless communication device mounted on a memory card. A memory card 331 contains a wireless communication device 355 and a body case 332. The memory card 331 uses the wireless communication device 355 for wireless communication with external devices. Here, in FIG. 19, the description of other installed elements (for example, a memory, and so on) in the memory card 331 is omitted.

Eighth Embodiment

In the present embodiment, a bus, a processor unit and an external interface unit are provided in addition to the configuration of the wireless communication device (the wireless communication device of the terminal (which may indicate the base station)) according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

Ninth Embodiment

In the present embodiment, a clock generating unit is provided in addition to the configuration of the wireless communication device (the wireless communication device of the terminal (which may indicate the base station)) according to any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Tenth Embodiment

In the present embodiment, a power source unit, a power source controlling unit and a wireless power feeding unit are included in addition to the configuration of the wireless communication device (the wireless communication device of the terminal (which may indicate the base station)) according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Eleventh Embodiment

In the present embodiment, a SIM card is added to the configuration of the wireless communication device according to any of the above embodiments. For example, the SIM card is connected with the controller, the transmitter, the receiver or plural of them in the wireless communication device. Thus, by adopting a configuration in which the SIM card is included in the wireless communication device, authentication processing can be easily performed.

Twelfth Embodiment

In the present embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Thirteenth Embodiment

In the present embodiment, an LED unit is added to the configuration of the wireless communication device (the wireless communication device of the terminal (which may indicate the base station)) according to any of the above embodiments. For example, the LED unit is connected to the controller, the transmitter, the receiver or plural of them in the wireless communication device. Thus, by adopting a configuration in which the LED unit is included in the wireless communication device, notifying the operation state of the wireless communication device to the user can be easily done.

Fourteenth Embodiment

In the present embodiment, a vibrator unit is included in addition to the configuration of the wireless communication device wireless communication device (the wireless communication device of the terminal (which may indicate the base station)) according to any of the above embodiments. For example, the vibrator unit is connected to at least one of the controller, the transmitter, the receiver or plural of them in the wireless communication device. Thus, by adopting a configuration in which the vibrator unit is included in the wireless communication device, notifying the operation state of the wireless communication device to the user can be easily done.

Fifteenth Embodiment

In the present embodiment, the configuration of the wireless communication device includes a display in addition to the configuration of the wireless communication device (the wireless communication device of the terminal (which may indicate the base station)) according to any one of the above embodiments. The display may be connected to the controller, the transmitter, the receiver or plural of them in the wireless communication device via a bus (not shown). As seen from the above, the configuration including the display to display the operation state of the wireless communication device on the display allows the operation status of the wireless communication device to be easily notified to a user.

Sixteenth Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection of the connection (release), there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. Normally, it is determined that the connection is disconnected at the timing of transmitting the frame to disconnect the connection in a wireless communication device on the side to transmit the frame and at the timing of receiving the frame to disconnect the connection in a wireless communication device on the side to receive the frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the frame to disconnect the connection cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Collision Avoidance is a suitable scheme to share a radio medium between the plurality of wireless communication devices.

[4] Frame Interval of Wireless LAN

The frame interval of IEEE802.11 wireless LAN is described. There are several types of frame intervals used in IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in IEEE802.11 wireless LAN, and a strict period from a previous frame is not discussed. Therefore, the definition is followed in the explanation of IEEE802.11 wireless LAN system. In IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 20:
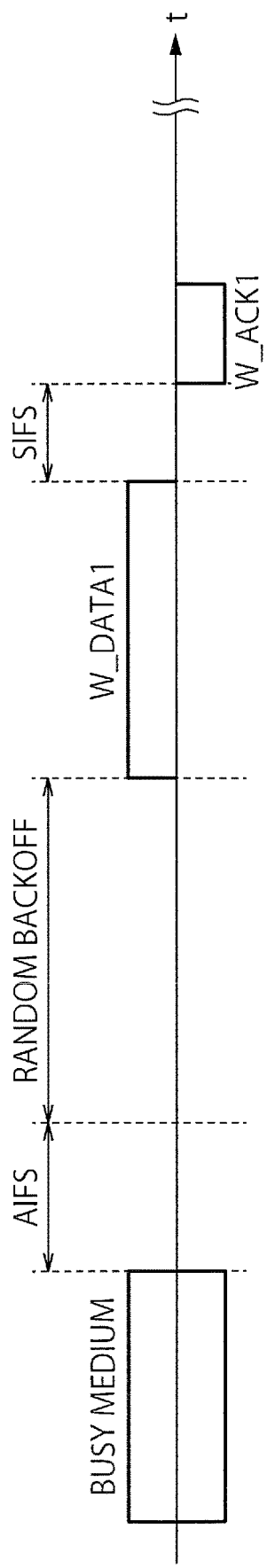
FIG. 20 is a diagram showing one example of frame exchange in a contention duration.

Here, FIG. 20 illustrates one example of frame exchange in a competitive period based on the random access in IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in IEEE802.11 wireless LAN), the default values are defined.

For example, in the definition of 802.11ac, with an assumption that SIFS is 16 µs and the slot time is 9 µs, and thereby PIFS is 25 µs, DIFS is 34 µs, the default value of the frame interval of an access category of BACKGROUND (AC_BK) in AIFS is 79 µs, the default value of the frame interval of BEST EFFORT (AC_BE) is 43 µs, the default value of the frame interval between VIDEO(AC_VI) and VOICE(AC_VO) is 34 µs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS.

Note that the frames described in the embodiments may indicate not only things called frames in, for example, IEEE 802.11 standard, but also things called packets, such as Null Data Packets.

The terms used in each embodiment should be interpreted broadly. For example, the term "processor" may encompass a general purpose processor, a central processing unit (CPU), a microprocessor, a digital signal processor (DSP), a controller (controlling circuitry), a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor. The circuitry" may refer one or more electric circuits disposed on a single chip, or may refer one or more electric circuits disposed on a plurality of chips or a plurality of devices in a dispersed manner.

In the specification, the expression "at least one of a, b or c" is an expression to encompass not only "a", "b", "c", "a and b", "a and c", "b and c", "a, b and c" or any combination thereof but also a combination of at least a plurality of same elements such as "a and a", "a, b and b" or "a, a, b, b, c and c". Also, the expression is an expression to allow a set including an element other than "a", "b" and "c" such as "a, b, c, and d".

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:

1. An electronic apparatus, comprising:
controlling circuitry configured to perform carrier sensing according to CSMA/CA (Carrier Sense Multiple Access with Collision Avoidance) to acquire a first access right into a first frequency resource of a wireless medium and perform carrier sensing according to the CSMA/CA to acquire a second access right into a second frequency resource of the wireless medium;
a first transmitter configured to transmit a first wireless signal of power feeding at the first frequency resource to a first terminal during a first period according to the first access right;
a second transmitter configured to transmit a second wireless signal of power feeding at the second frequency resource to the first terminal during a second period according to the second access right; and
wherein the controlling circuitry is configured to control the first transmitter and the second transmitter, wherein the first period overlaps at least partially with the second period.

2. The electronic apparatus according to claim 1,
wherein the controlling circuitry is configured to form a directivity by the first wireless signal and the second wireless signal, based on a direction to the first terminal.

3. The electronic apparatus according to claim 1,
wherein the controlling circuitry is configured to determine an overlapped period of the first period and the second period.

4. The electronic apparatus according to claim 3, further comprising
first wireless communication circuitry communicable with the first terminal,
wherein the first wireless communication circuitry is configured to receive first information for specifying a required power amount of the first terminal.

5. The electronic apparatus according to claim 4,
wherein the first transmitter and the second transmitter are configured to transmit the first wireless signal and the second wireless signal according to a first wireless communication scheme, and the first wireless communication circuitry is configured to receive the first information according to a second wireless communication scheme different from the first wireless communication scheme.

6. The electronic apparatus according to claim 5, wherein the first wireless communication scheme is a communication scheme in conformity with a wireless LAN protocol specified in IEEE 802.11, and the second wireless communication scheme is a communication scheme in conformity with Bluetooth®.

7. The electronic apparatus according to claim 3, wherein the controlling circuitry is configured to determine an overlapped period of the first period and the second period wherein power feeding ends within a third period.

8. The electronic apparatus according to claim 7, further comprising second wireless communication circuitry communicable with a second terminal, wherein the controlling circuitry is configured to identify a time period other than a time period during which communication with the second terminal is performed, and the first third time period is included, based on in the identified time period.

9. The electronic apparatus according to claim 3, wherein the controlling circuitry is configured to determine a number of transmitters to be used for power feeding, and select the determined number of transmitters from among the first transmitter and the second transmitter.

10. The electronic apparatus according to claim 1, wherein the controlling circuitry is configured to obtain second information representing a power conversion efficiency at the first terminal in each case of transmission of wireless signals which at least partially overlap with each other with respect to combinations of a plurality of transmitters including the first transmitter and the second transmitter, the controlling circuitry is configured to select a combination with the power conversion efficiency higher than or equal to a threshold, from among the combinations of the plurality of transmitters, and transmit the wireless signals from the selected combination to the first terminal.

11. The electronic apparatus according to claim 1, further comprising second wireless communication circuitry communicable with a second terminal, wherein the second wireless communication circuitry includes one transmitter among the first transmitter and the second transmitter, and the one transmitter in the second wireless communication circuitry is configured to transmit a frame to the second terminal in a time period during which the one transmitter does not transmit the wireless signal.

12. The electronic apparatus according to claim 1, wherein the first frequency resource and the second frequency resource are frequency channels different from each other.

13. The electronic apparatus according to claim 1, wherein the first frequency resource and the second frequency resource are frequency channels identical to each other.

14. The electronic apparatus according to claim 1, further comprising at least one antenna.

15. A power feeding method, comprising:

performing carrier sensing to acquire a first access right into a first frequency resource of a wireless medium according to CSMA/CA (Carrier Sense Multiple Access with Collision Avoidance);

performing carrier sensing to acquire a second access right into a second frequency resource of the wireless medium according to the CSMA/CA;

transmitting a first wireless signal of power feeding at the first frequency resource from a first transmitter to a first terminal during a first period according to the first access right;

transmitting a second wireless signal of power feeding at the second frequency resource from a second transmitter to the first terminal during a second period according to the second access right; and controlling transmission of the first wireless signal and transmission of the second wireless signal wherein the first period overlaps at least partially with the second period.

* * * * *